United States Patent [19]

Orsic

[11] Patent Number: 4,521,880
[45] Date of Patent: Jun. 4, 1985

[54] TIME-SLOT INTERCHANGER FOR FAST CIRCUIT SWITCHING

[75] Inventor: Milo Orsic, Lincolnwood, Ill.

[73] Assignee: AT&T Bell Laboratories, Murray Hill, N.J.

[21] Appl. No.: 558,504

[22] Filed: Dec. 6, 1983

[51] Int. Cl.³ .......................................... H04Q 11/04
[52] U.S. Cl. ........................................ 370/68; 370/58
[58] Field of Search ........................... 370/66, 68, 58; 179/2 DP, 18 ES; 178/3

[56] References Cited

U.S. PATENT DOCUMENTS

| | | | |
|---|---|---|---|
| 3,743,788 | 7/1973 | Krupp et al. | 179/15 |
| 4,112,258 | 9/1978 | Alles | 179/15 |
| 4,131,762 | 12/1978 | Reid | 370/68 |
| 4,201,889 | 5/1980 | Lawrence et al. | 370/68 |
| 4,201,890 | 5/1980 | Lawrence et al. | 370/68 |
| 4,207,435 | 6/1980 | Okada et al. | 370/68 |
| 4,214,128 | 7/1980 | Bovee et al. | 370/68 |
| 4,224,474 | 9/1980 | Savit | 370/68 |
| 4,322,843 | 3/1982 | Beuscher et al. | 370/58 |
| 4,377,859 | 3/1983 | Dunning et al. | 370/58 |
| 4,382,294 | 5/1983 | Beuscher et al. | 370/58 |
| 4,382,295 | 5/1983 | Moffitt et al. | 370/68 |
| 4,392,224 | 7/1983 | Mori et al. | 370/68 |
| 4,425,641 | 1/1984 | French et al. | 370/58 |
| 4,470,139 | 9/1984 | Munter | 370/66 |
| 4,484,323 | 11/1984 | Beuscher et al. | 370/58 |
| 4,485,469 | 11/1984 | Witmore | 370/68 |

Primary Examiner—Douglas W. Olms
Assistant Examiner—Kenneth I. Rokoff
Attorney, Agent, or Firm—Ross T. Watland

[57] ABSTRACT

A fast circuit switching system that establishes a circuit for each packet-sized data communication. A time-slot interchanger included in the system network has a sequential access, circulating control memory, the contents of which can be rapidly and frequently changed with minimal impairment of time-slot interchanger throughput. Such changes are effected by controlling the transmission of information concerning established connections, from a control memory output register to a control memory input register and by controlling the transmission of information concerning new connections, to the control memory input register.

23 Claims, 24 Drawing Figures

DMA TRANSMIT CONTROL CIRCUIT 2006
STATE DIAGRAM

FIG. 22
TRUTH TABLE FOR SELECT LOGIC CIRCUIT 5496

| OUTPUT REGISTER 5446-31 BIT 0 | REGISTER 5495 | BUS 5440 BIT 0 | LOGIC SIGNAL TRANSMITTED TO ENABLE GATE 5443 | LOGIC SIGNAL TRANSMITTED TO ENABLE GATE 5441 | LOGIC SIGNAL TRANSMITTED TO ENABLE GATE 5444 |
|---|---|---|---|---|---|
| 0 | 0 | 0 | 1 | 0 | 0 |
| 0 | 0 | 1 | 0 | 1 | 0 |
| 0 | 1 | 0 | X | X | X |
| 0 | 1 | 1 | X | X | X |
| 1 | 0 | 0 | 0 | 0 | 1 |
| 1 | 0 | 1 | 1 | 0 | 1 |
| 1 | 1 | 0 | 1 | 1 | 0 |
| 1 | 1 | 1 | 0 | 1 | 0 |

X — DON'T CARE

FIG. 23
PORT CONTROLLER 4000-0

| FIG. 4 | FIG. 6 | FIG. 8 |
|---|---|---|
| FIG. 5 | FIG. 7 | FIG. 9 |

FIG. 24
TSI 5100-0

| FIG. 11 | FIG. 13 | FIG. 15 |
|---|---|---|
| FIG. 12 | FIG. 14 | FIG. 16 |

TIME-SLOT INTERCHANGER FOR FAST CIRCUIT SWITCHING

CROSS-REFERENCE TO RELATED APPLICATION

This application is related to the application of M. Orsic, Ser. No. 558,630 filed Dec. 6, 1983, entitled, "Fast Circuit Switching System".

TECHNICAL FIELD

This invention relates to time division switching networks and, more particularly, to time-slot interchangers for use in data communication networks capable of rapidly effecting many network path changes while maintaining high throughput.

BACKGROUND OF THE INVENTION

Circuit switching is a method of network switching where a dedicated circuit, e.g., a physical path from transmitter to receiver or a particular time slot on such physical path, is established before and maintained throughout each communication. Circuit switching has long been used for voice communication. However, because of the long circuit setup times and the dedication of switch resources for call duration that are involved with known circuit switching networks, packet switching is typically used for data communication since such communication usually occurs in short, high-rate bursts, with long pauses between bursts. Packet switching networks are characterized in that messages are broken down into standard-size packets which are individually routed through the network and in that computers using sophisticated software packages are employed to perform the packet switching functions at the nodes within the network.

Because of evolving technological advances useful in implementing circuit switching networks and because of the complexity of known packet switching systems, circuit switching is sometimes a preferable alternative for use in many data communication applications. Circuit switching networks are frequently implemented with time-slot interchangers having random access memories wherein digital samples are sequentially written into a sample memory and are read from locations of that memory in the order specified by control words read from a control memory. One limitation on the throughput capacity of such time-slot interchangers is the access speed of the random access memories. Known time-slot interchangers have included double-buffered sample memories wherein during a given time interval or frame, samples are sequentially written into a first sample memory while samples which were written into a second sample memory during the previous frame, are being read from the second memory. Since write access and read access are only required of each memory during alternate frames, the number of accesses per frame for each memory is decreased and the throughput of the time-slot interchanger can be correspondingly increased. With known time-slot interchangers used for voice communication, the contents of the control memory are changed only relatively infrequently. Such changes can be made by dedicating a small portion of each frame, i.e., one or two time slots, for control memory write access. However, when a circuit switching network is to be used in data communication applications requiring that a circuit be established for each packet-sized data communication, many control memory changes may have to be effected during each frame.

Providing control memory read access and write access during alternate halves of each time slot, although allowing needed changes to be made, reduces the maximum throughput of the time-slot interchanger.

In view of the foregoing, a recognized problem in the art is the reduction in throughput capacity of known time-slot interchangers with random access control memories when used in data communication circuit switching applications requiring frequent control memory changes.

SUMMARY OF THE INVENTION

The aforementioned problem is solved and a technical advance is achieved in accordance with the principles of an illustrative embodiment of the invention advantageously in a time-slot interchanger having a departure in the art including a specific exemplary sequential access, circulating control memory, the contents of which can be rapidly and frequently changed with minimal impairment of time-slot interchanger throughput by controlling the transmission of information concerning established connections, from a control memory output register to a control memory input register and by controlling the transmission of information concerning new connections, to the control memory input register.

An illustrative arrangement in accordance with the invention includes a number of input storage locations and a number of output storage locations. Connection words each defining one of the input storage locations and one of the output storage locations are sequentially received on a control memory input path. A control memory stores, for at most one frame, each of the connection words received on the control memory input path. Digital words stored in input storage locations are transferred to output storage locations in response to the connection words stored by the control memory. A first enable gate selectively transmits connection words stored by the control memory, to the control memory input path for storage again by the control memory.

One specific embodiment of an arrangement in accordance with the invention further includes a new connection word storage arrangement that stores new connection words each defining one of the input storage locations and one of the output storage locations. A second enable gate transmits the new connection words stored by the new connection word storage arrangement, to the control memory input path for storage by the control memory. The second enable gate is controlled such that the new connection words stored by the new connection word storage arrangement, are transmitted to the control memory input path during times when no connection words stored by the control memory, are being transmitted by the first enable gate. The embodiment further includes a number of disconnect memory locations, each associated with one of the output storage locations, for storing disconnect signals. The transmission by the first enable gate of a given one of the connection words stored by the control memory is inhibited, when a disconnect signal is stored in the disconnect memory location associated with the output storage location defined by that given connection word.

In the specific embodiment, the control memory includes an input register, an output register and a number of intermediate registers connected in series between the input register and the output register. The input register receives connection words from the control memory input path and transmits connection words to a first one of the intermediate registers. The output register receives connection words from a last one of the intermediate registers and transmits connection words to the first enable gate. Each connection word received by the control memory input path is shifted through the input register, each of the intermediate registers and the output register. Digital words are read from input storage locations defined by the connection words shifted to the last intermediate register. Digital words read from input storage locations are written into output storage locations defined by the connection words shifted to the output register.

DRAWING DESCRIPTION

Figure 1:
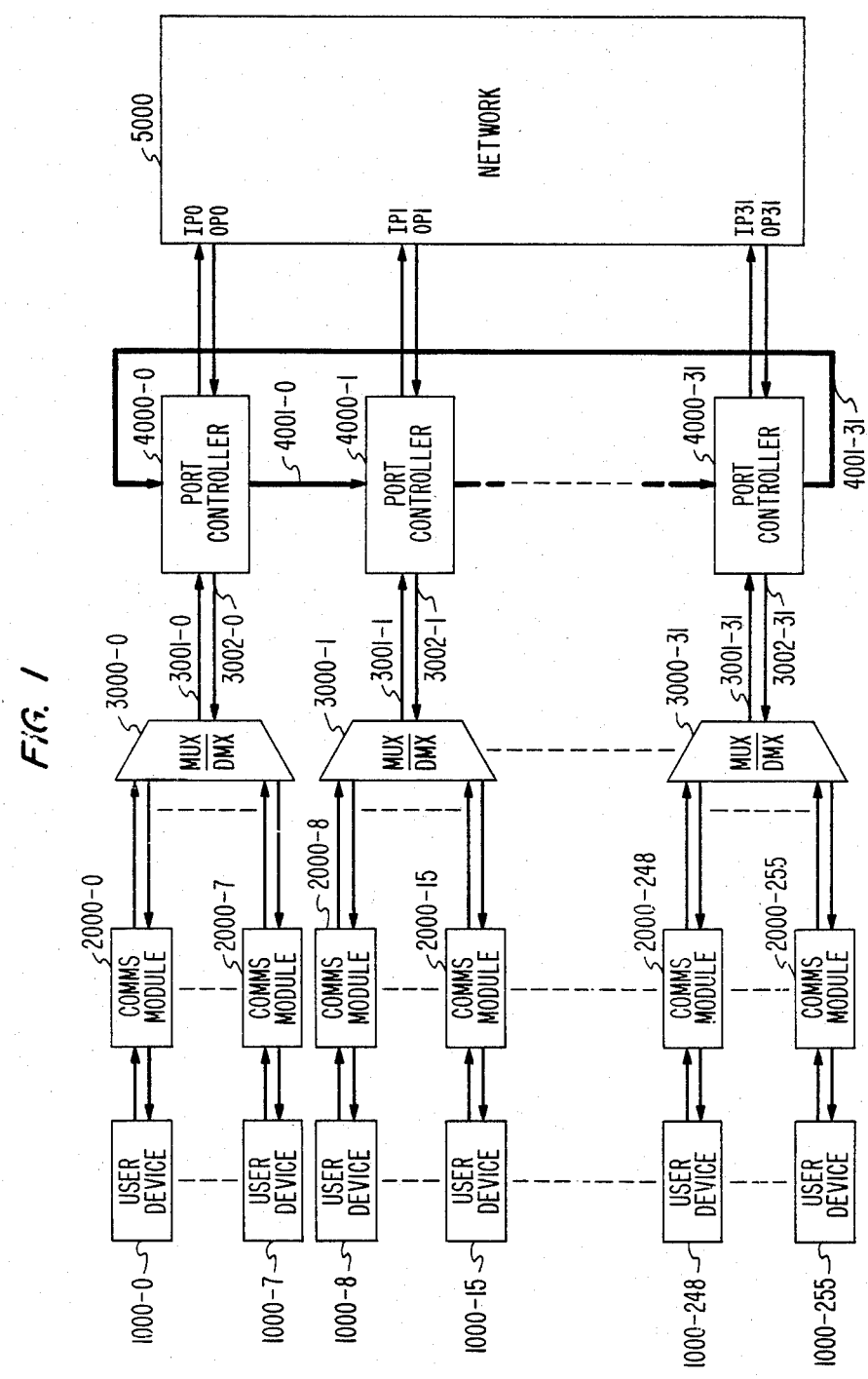
FIG. 1 is a block diagram of an exemplary fast circuit switching system that establishes a circuit for each packet-sized data communication.
Figure 2:
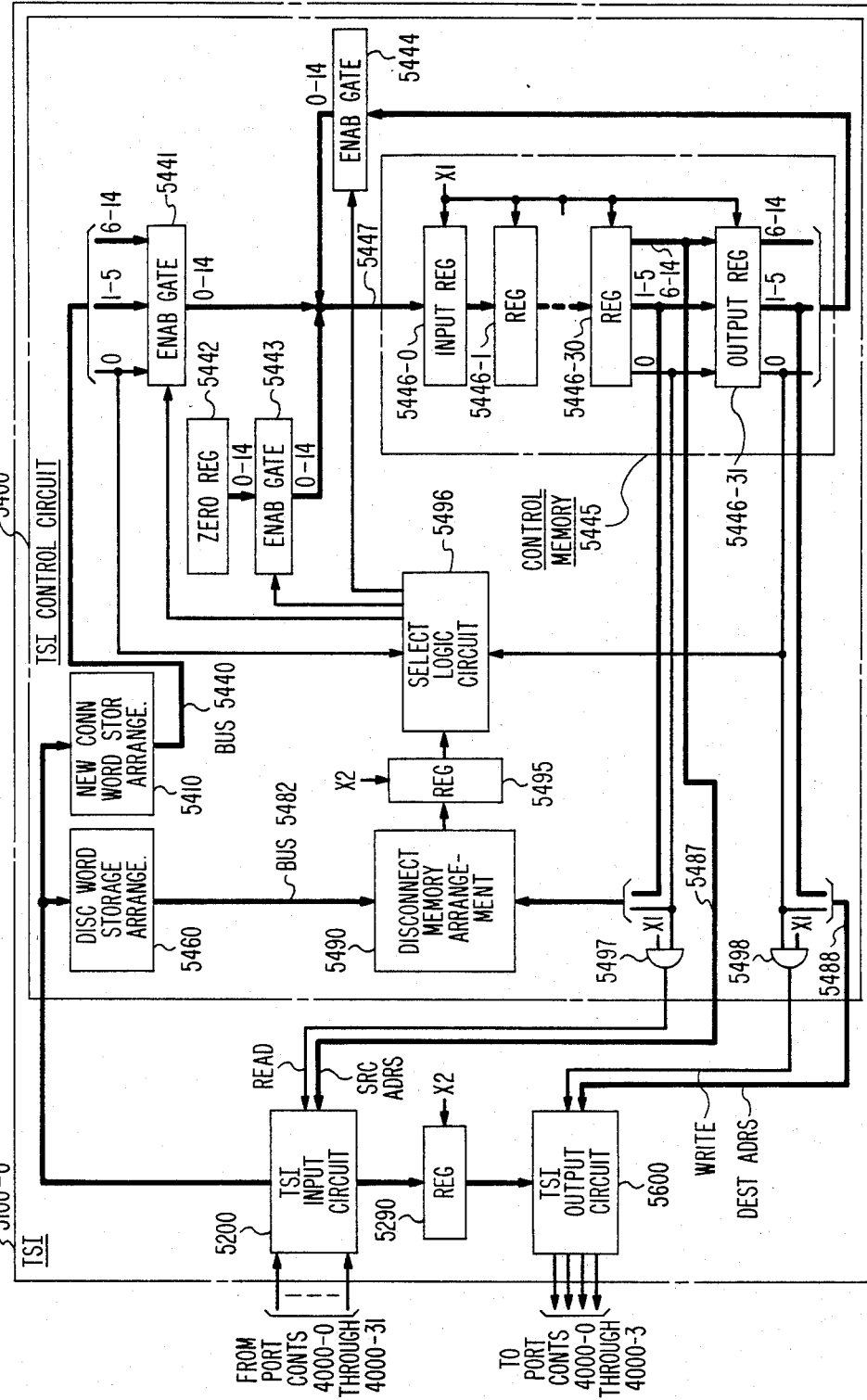
FIG. 2 is a block diagram of an illustrative time-slot interchanger in accordance with the present invention that is advantageously used to effect fast circuit switching in a network which is a part of the system of FIG. 1.
Figure 10:
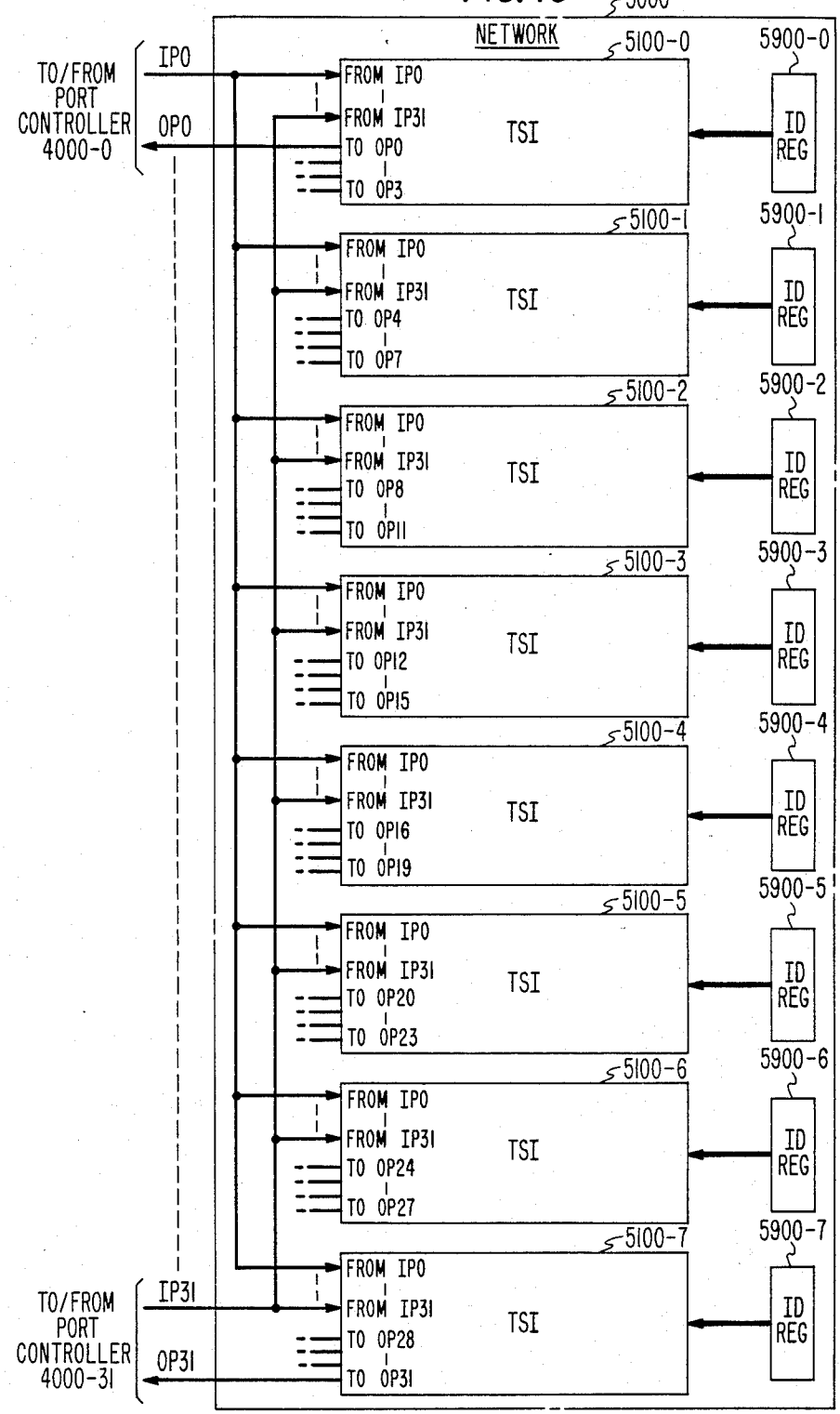

FIGS. 4 through 9, when arranged in accordance with FIG. 23, is a detailed diagram of a port controller included in the system of FIG. 1;

FIG. 10 is a block diagram of the network included in the system of FIG. 1;

FIGS. 11 through 16 when arranged in accordance with FIG. 24, is a more detailed diagram of the time-slot interchanger of FIG. 2, illustrating the mechanism in accordance with the invention that is capable of rapidly effecting many network path changes while maintaining high throughput by utilizing a sequential access, circulating control memory, the contents of which can be rapidly and frequently changed.

Figure 3:
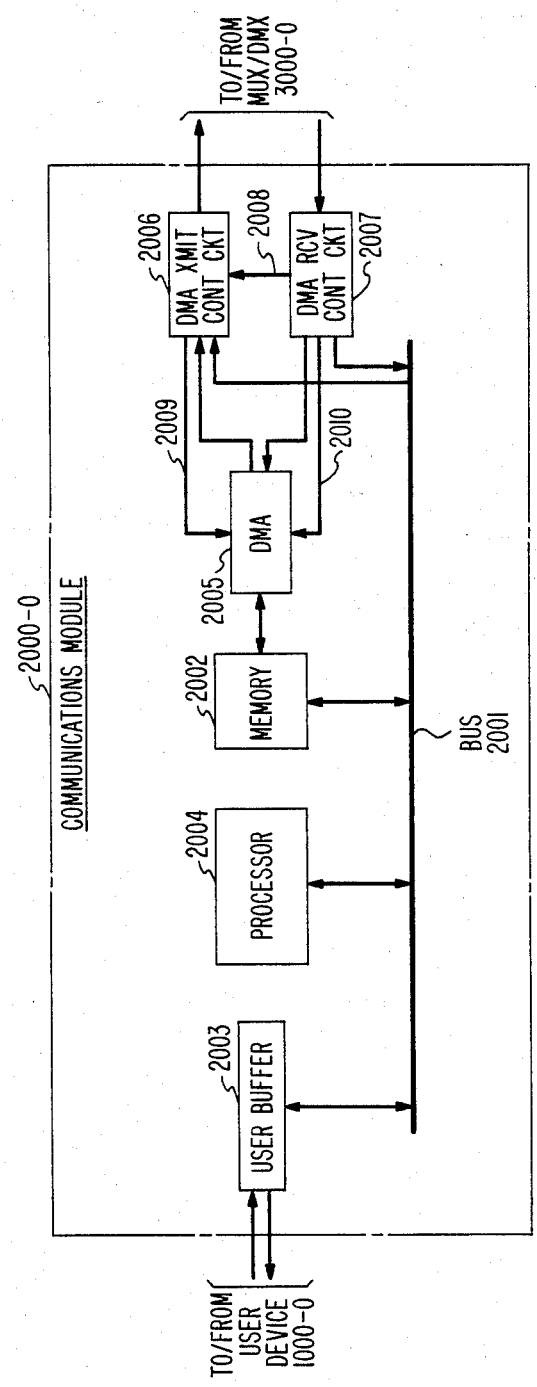
FIG. 3 is a block diagram of a communications module included in the system of FIG. 1.
Figure 4:
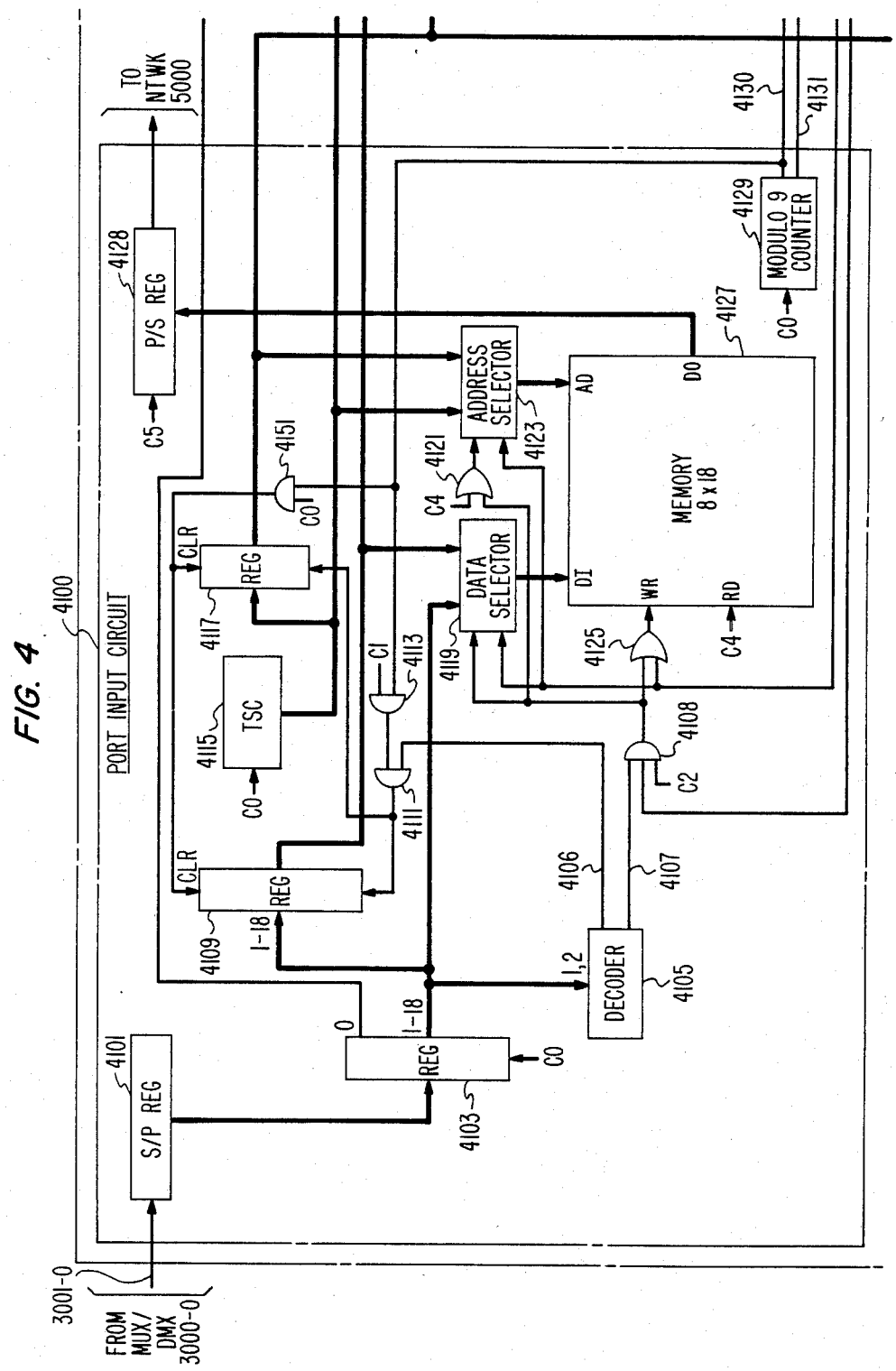
Figure 5:
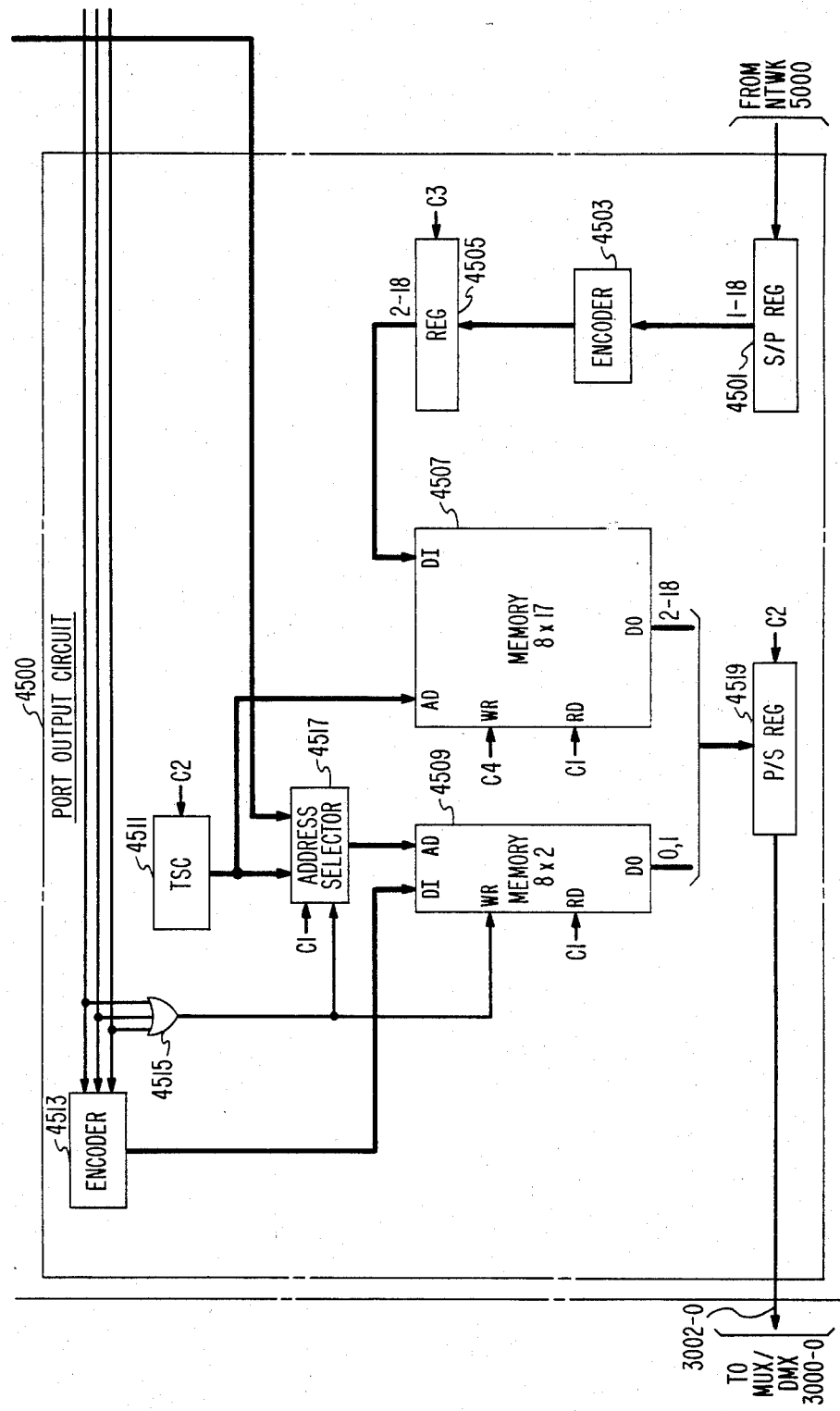
Figure 6:
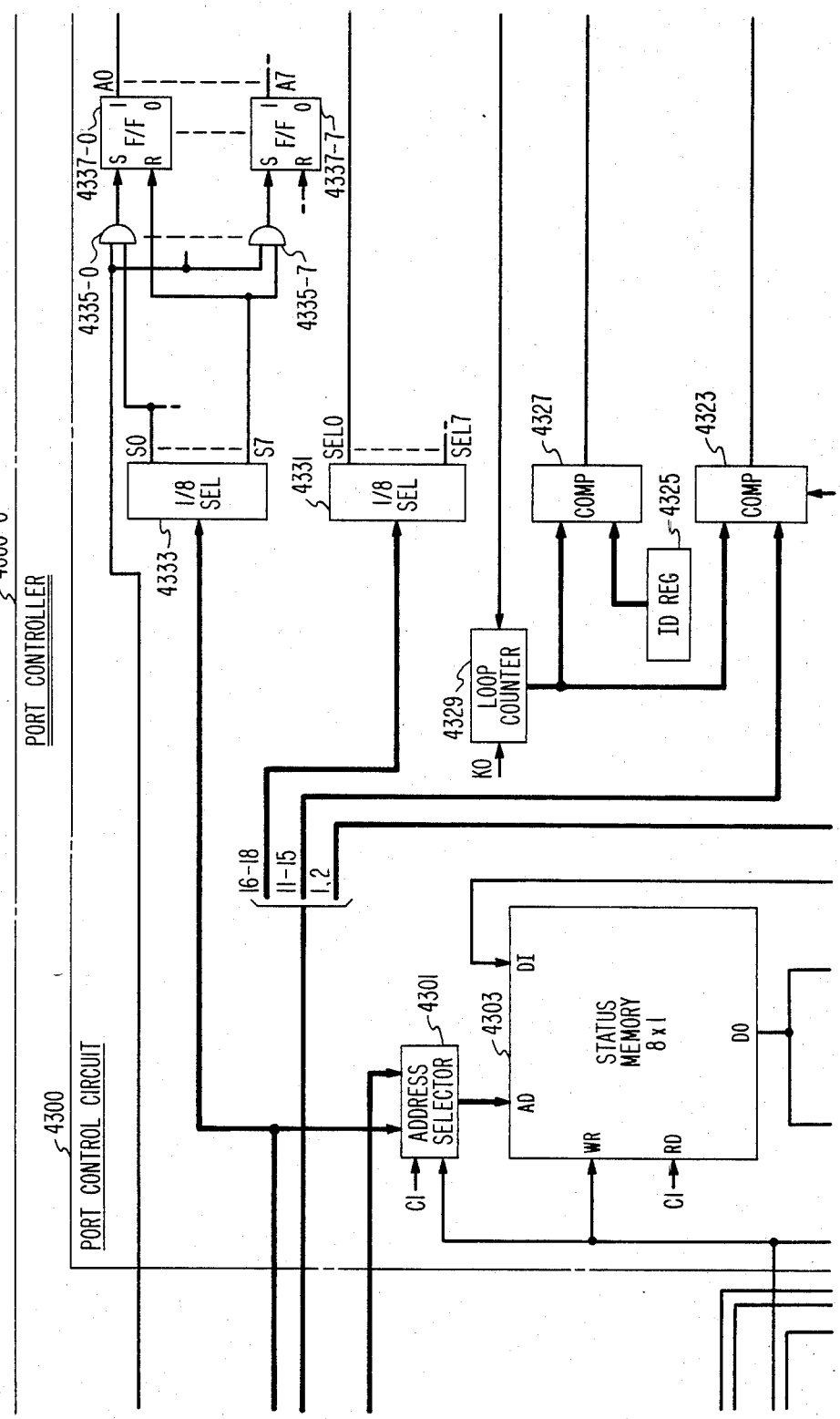
Figure 7:
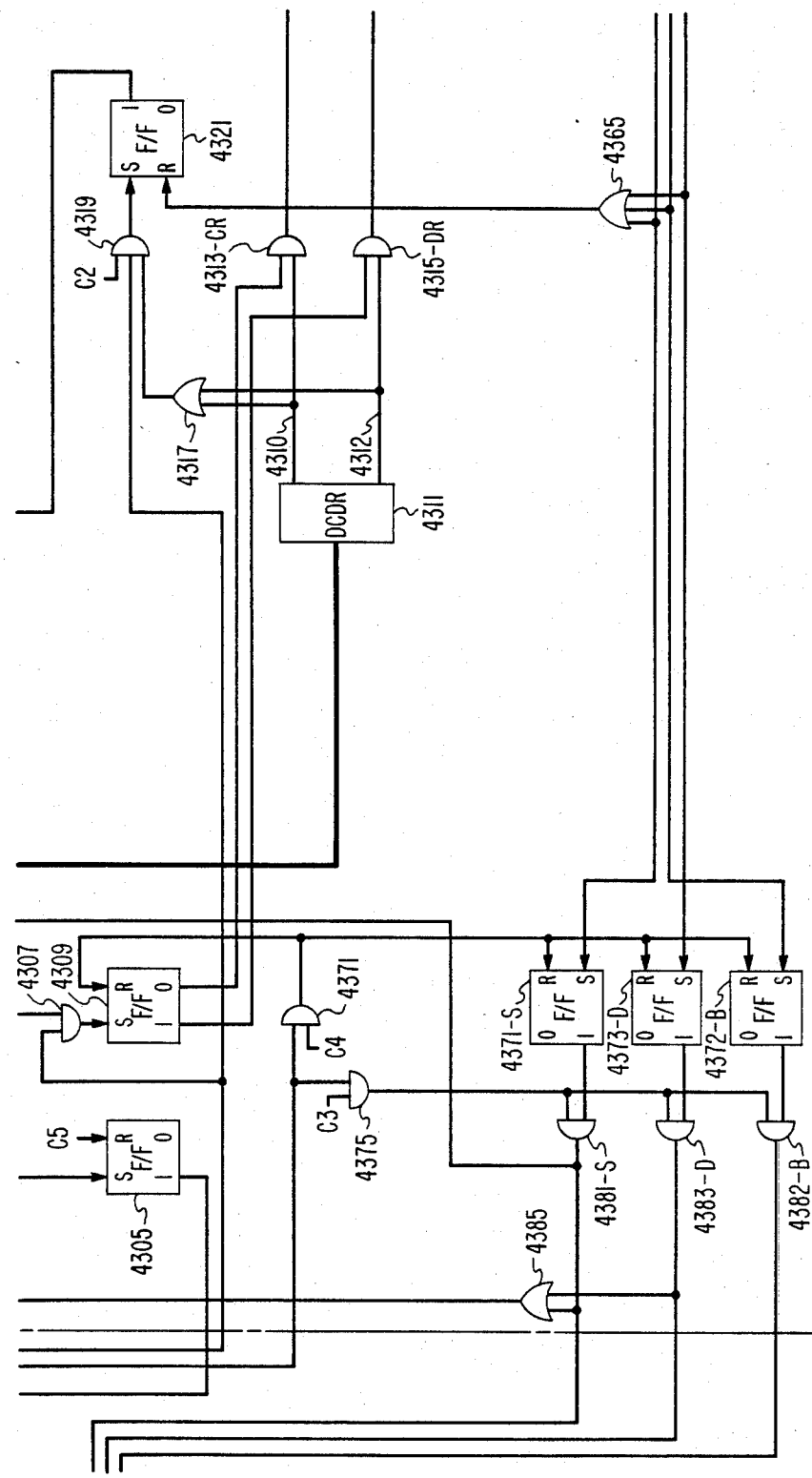
Figure 8:
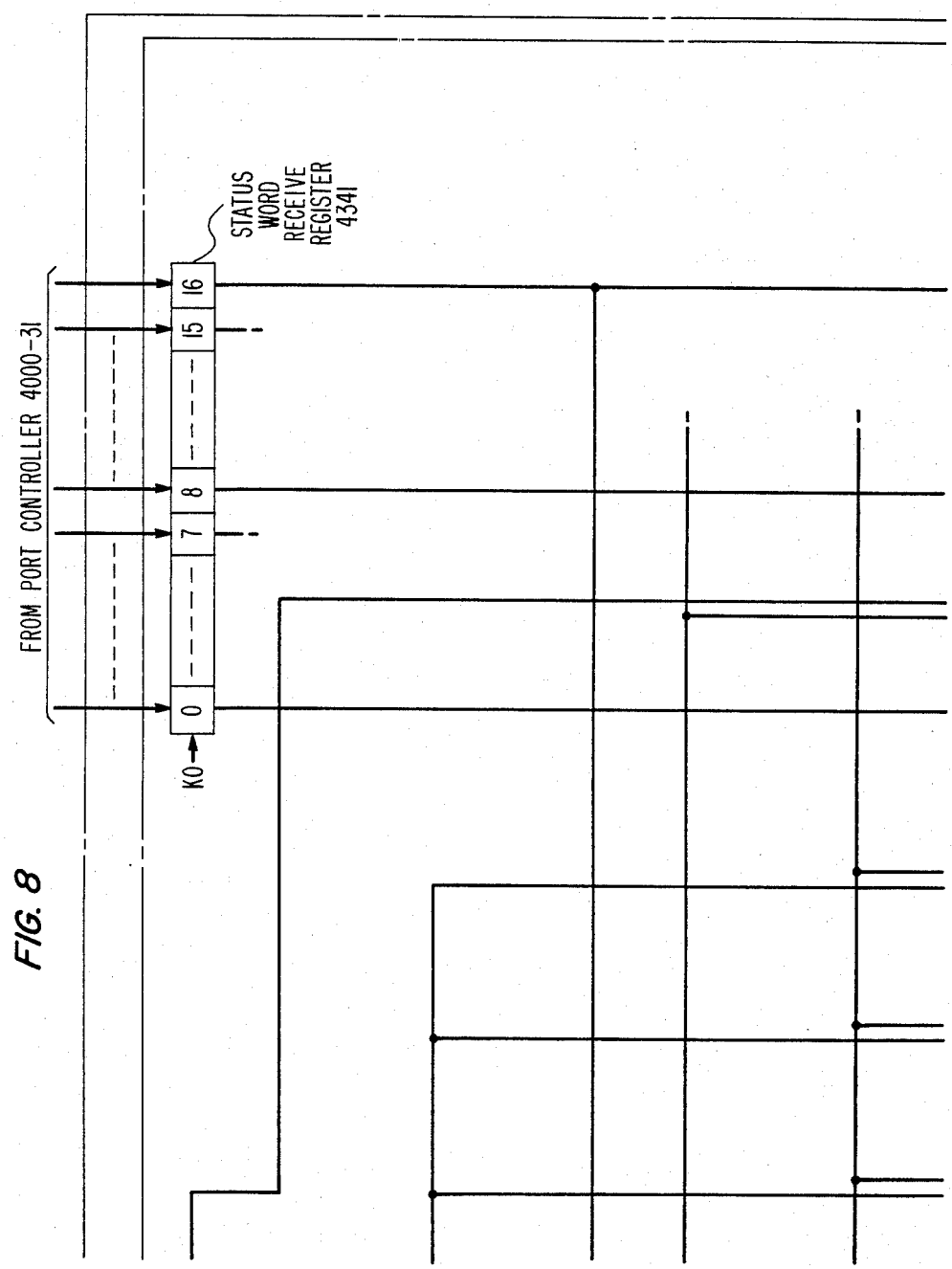
Figure 9:
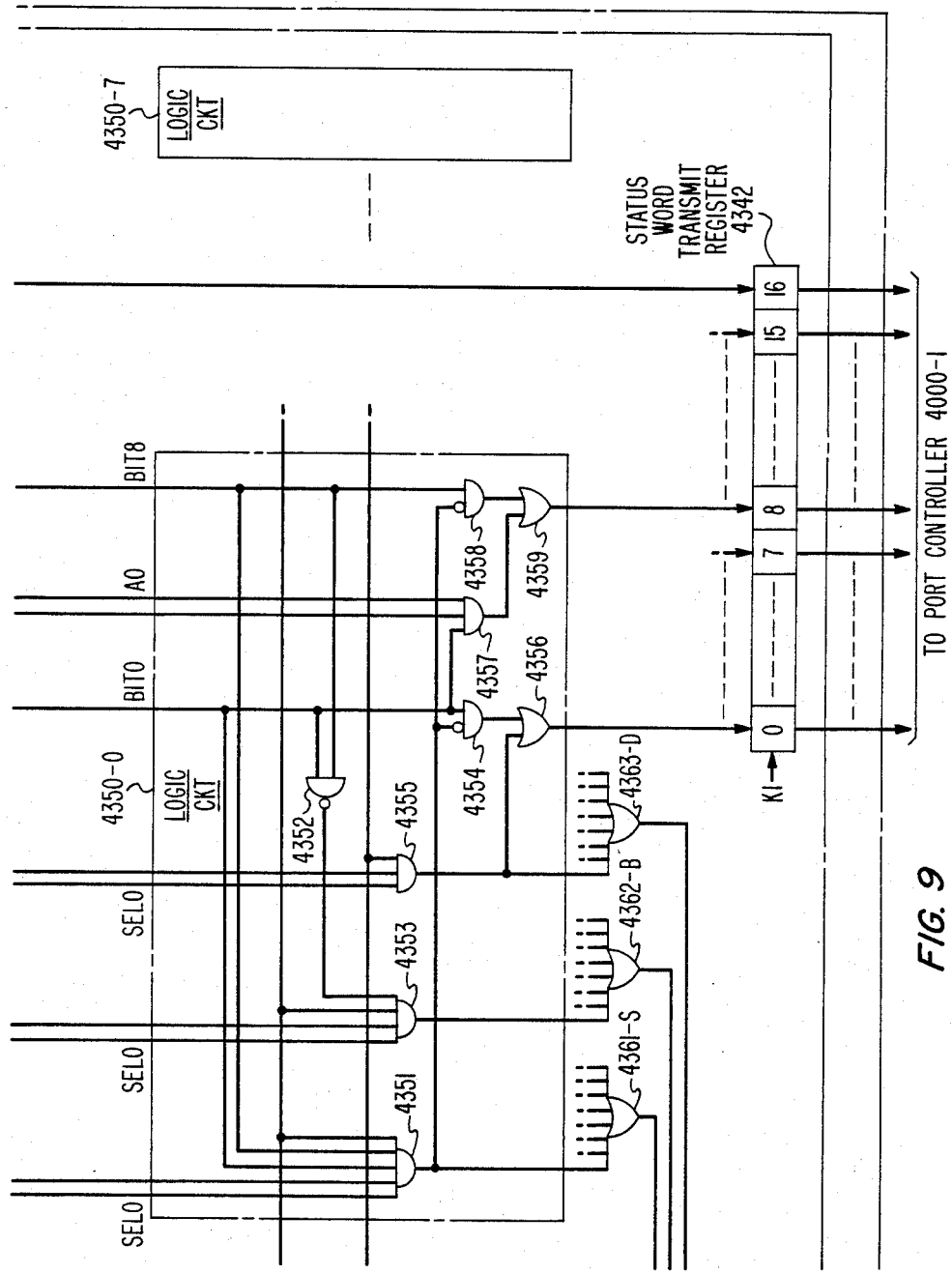
Figure 17:
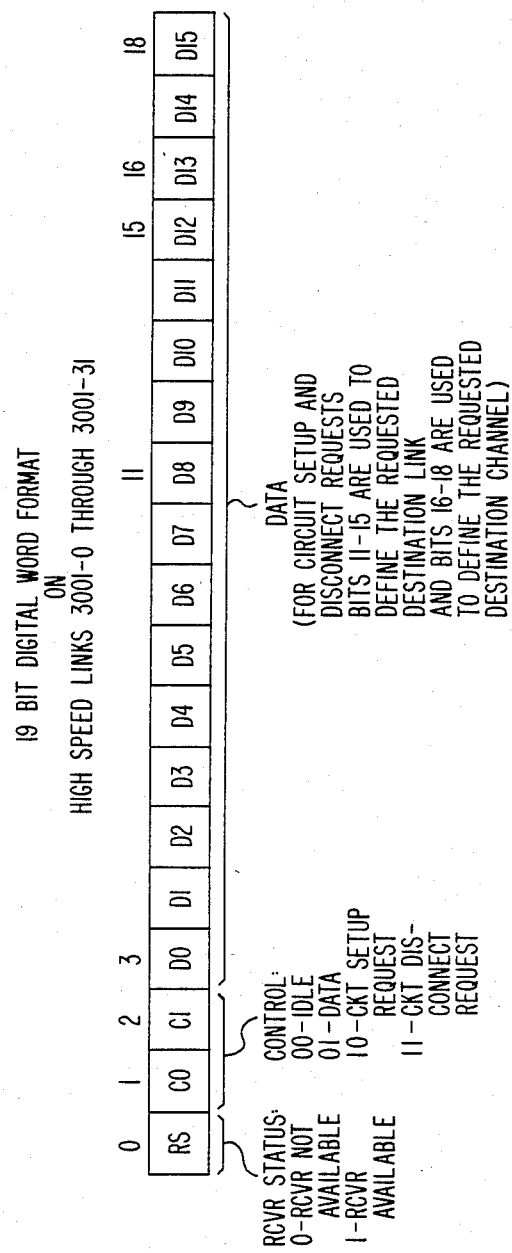
Figure 18:
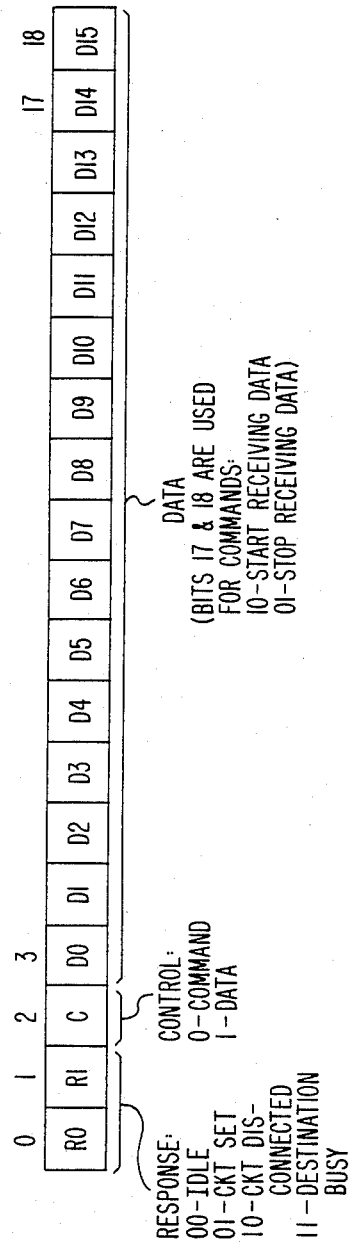
Figure 19:
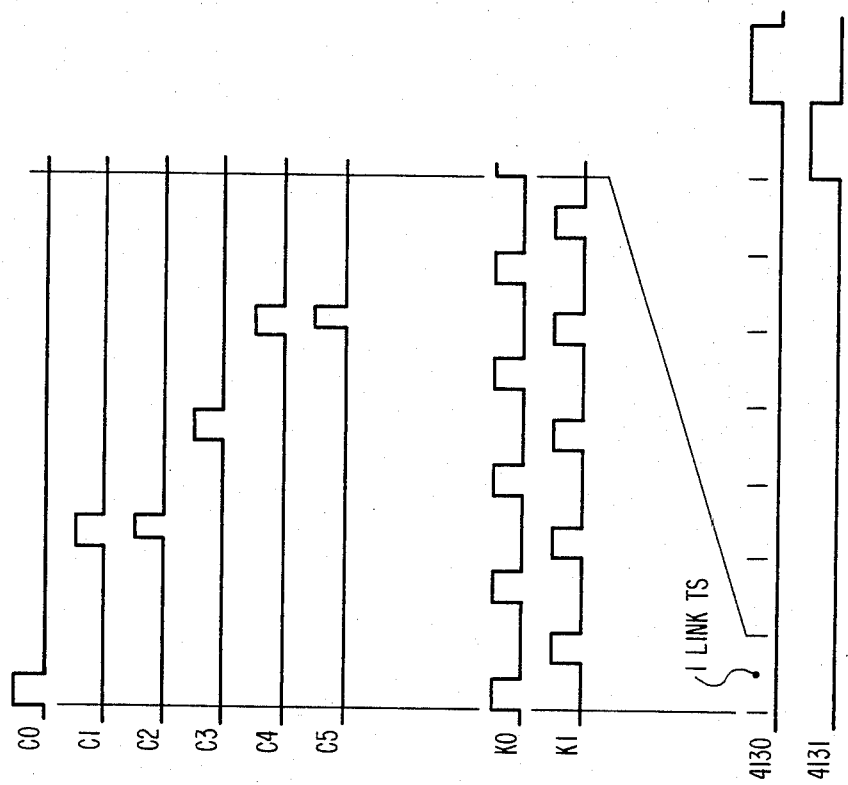
Figure 20:
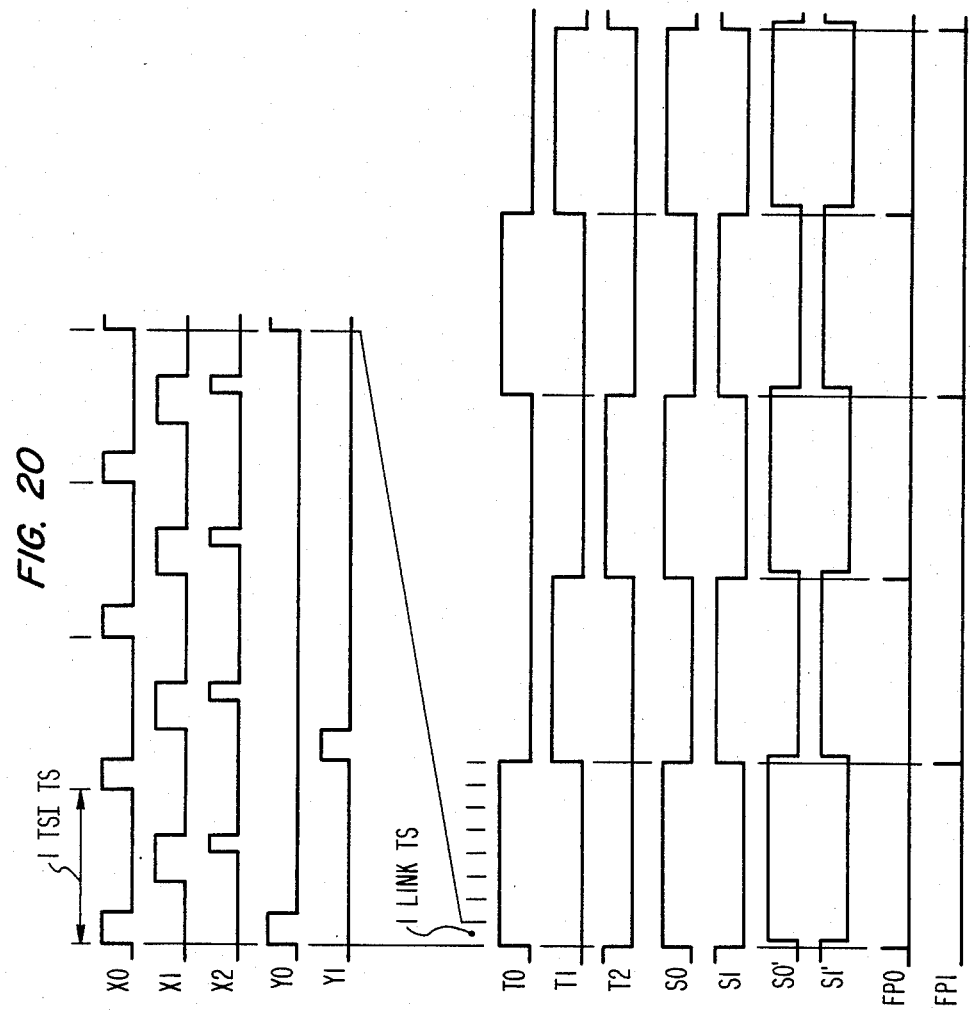
Figure 21:
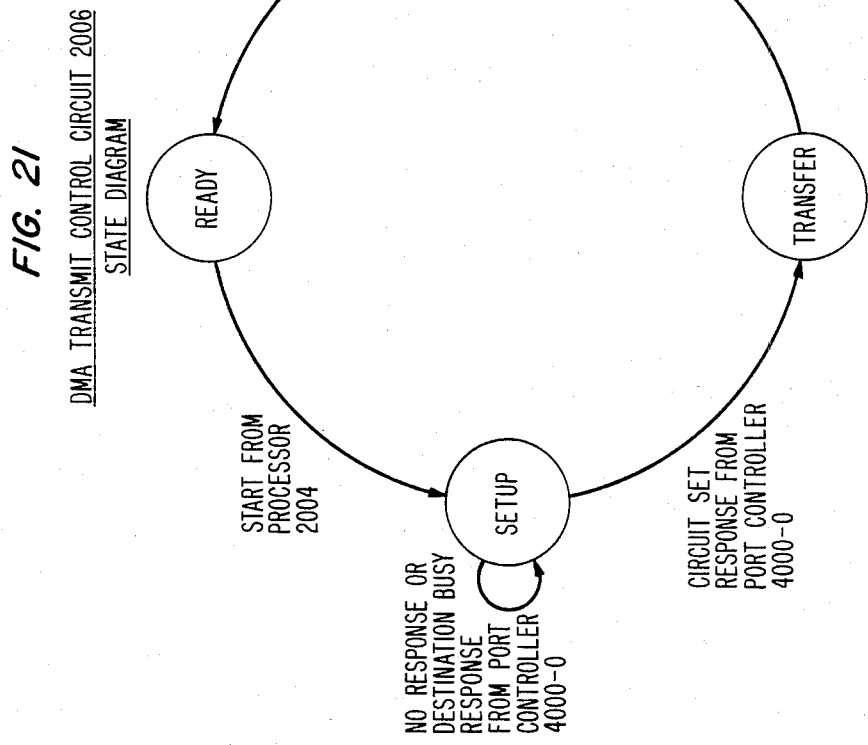

FIGS. 17 and 18 present digital word formats used on high-speed communication links included in the system of FIG. 1;

FIG. 19 is a timing diagram relevant to the port controller of FIGS. 4 through 9;

FIG. 20 is a timing diagram relevant to the time-slot interchanger of FIGS. 11 through 16;

FIG. 21 is a state diagram for a circuit included in the communications module of FIG. 3; and FIG. 22 is a truth table for a logic circuit included in the time-slot interchanger of FIGS. 11 through 16.

GENERAL DESCRIPTION

FIG. 1 is a block diagram of an illustrative fast circuit switching system used for data communication among 256 user devices 1000-0 through 1000-255 representing any of a wide variety of devices including teleterminals, printers, computers and databases. Each user device 1000-0 through 1000-255 interfaces with the system via an associated one of 256 communications modules 2000-0 through 2000-255. The information transmitted by eight of the communications modules 2000-0 through 2000-7 is multiplexed by a multiplexer/demultiplexer 3000-0 onto eight time-multiplexed source channels 0 through 7 of a high speed communications link 3001-0, e.g., a fiber optic link, for transmission to a port controller 4000-0. Similarly, the information transmitted by the other communications modules 2000-8 through 2000-255 is multiplexed by multiplexer/demultiplexer 3000-1 through 3000-31 onto time-multiplexed source channels 0 through 7 of high speed communications links 3001-1 through 3001-31 to port controllers 4000-1 through 4000-31. Information is conveyed among the port controllers 4000-0 through 4000-31 by a switching network 5000. Port controller 4000-0 transmits information received from network 5000, in eight time-multiplexed destination channels 0 through 7 on a high speed communications link 3002-0 to multiplexer/demultiplexer 3000-0, which demultiplexes that information for transmission to the eight communications modules 2000-0 through 2000-7. Similarly, port controllers 4000-1 through 4000-31 transmit information received from network 5000, in time-multiplexed destination channels 0 through 7 on high speed communications links 3002-1 through 3002-31 to the multiplexer/demultiplexers 3000-1 through 3000-31, which demultiplex that information for transmission to communications modules 2000-8 through 2000-255. Accordingly, each of the communications modules 2000-0 through 2000-255 is permanently associated with one source channel on one of the 32, eight-channel links 3001-0 through 3001-31 and with one destination channel on one of the 32, eight-channel links 3002-0 through 3002-31.

Multiplexer/demultiplexer 3000-0 transmits one 19-bit digital word during each occurrence of a source channel on link 3001-0. The format of the digital words transmitted on links 3001-0 through 3001-31 is shown in FIG. 17. The format includes a receiver status bit used to define the availability of the communications module to receive data in its associated destination channel, a two-bit control field used to define the digital word as an idle word, a data word, a circuit setup request word or a circuit disconnect request word and a 16-bit data field. Further, for circuit setup request words and circuit disconnect request words, five bits of the data field are used to define the requested destination link of the 32 links 3002-0 through 3002-31 and three bits of the data field are used to define the requested destination channel of the eight channels on the requested destination link. Equivalently, those eight data field bits define the requested destination communications module of the 256 communications modules 2000-0 through 2000-255.

Port controller 4000-0 transmits one 19-bit digital word during each occurrence of a destination channel on link 3002-0. The format of the digital words transmitted on links 3002-0 through 3002-31 is shown in FIG. 18. The format includes a two-bit response field used to transmit responses to circuit setup request words or circuit disconnect request words transmitted by a given communications module. The responses to a circuit setup request word are either a circuit set response or a destination busy response and the response to a circuit disconnect request word is a circuit disconnected response. The format also has a control bit defining the digital word as either a command word or a data word and further includes a 16-bit data field. For command words, two bits of the data field are used to convey the two possible commands, a START RECEIVING DATA command used to command a communications module to begin storing the data words received in its associated destination channel and a STOP RECEIVING DATA command used to command the communications module to stop storing the data words received in its associated destination channel.

The digital words on links 3001-0 through 3001-31, 3002-0 through 3002-31 as well as on the links between the port controllers 4000-0 through 4000-31 and network 5000 further include parity and synchronization bits (not shown) to detect errors and maintain system synchronization, respectively. The use of such bits is well known and is, therefore, not described herein.

Information is conveyed on links 3001-0 through 3001-31 and 3002-0 through 3001-31 in frames each comprising eight time slots or channels. In contrast to voice switching systems which typically operate in 125-microsecond frames, the present exemplary system operates in 62.5-microsecond frames. Since each communications module transmits 16 data bits per frame, the effective data rate of each communications module is 256 kilobits per second.

When a given communications module, e.g., 2000-0, wishes to establish communications with a particular destination communications module, e.g., 2000-248, communications module 2000-0 begins transmitting in its associated source channel 0 on link 3001-0, circuit setup request words defining the destination channel associated with communications module 2000-248, i.e., channel 0 of link 3002-31. The port controllers 4000-0 through 4000-31 collectively maintain a database comprising thirty-two, 17-bit status words defining the availability of destination channels and the availability of destination communications modules to receive data. In the present embodiment, each of the port controllers 4000-0 through 4000-31 stores one of the status words. The status words are repetitively cycled through each of the port controllers 4000-0 through 4000-31 via the transmission paths 4001-0 through 4001-31. Each status word includes eight bits that define the availability of the eight destination channels on one of the links 3002-0 through 3002-31 and eight bits that define the availability of the communications modules associated with those destination channels to receive data. One status word bit is used to define status word 0 among the sequence of 32 status words 0 through 31. In the present embodiment, port controller 4000-0 is only responsive to circuit setup request or circuit disconnect request words received from a given one of the communications modules 2000-0 through 2000-7, during one frame out of each sequence of eight consecutive frames. Port controller 4000-0 responds to one of the circuit setup request words defining destination channel 0 of link 3002-31 by storing that circuit setup request word until status word 31, defining the availability of the destination channels on link 3002-31 and the availability of the communications modules 2000-248 through 2000-255 to receive data, is cycled to port controller 4000-0 to be stored therein. If that status word indicates that either destination channel 0 of link 3002-31 is unavailable or that communications module 2000-248 is presently unavailable to receive data, port controller 4000-0 transmits a destination busy response to communications module 2000-0 which continues to transmit circuit setup request words to attempt to establish communication with communications module 2000-248. However, if the status word indicates both that destination channel 0 of link 3002-31 is available and that communicates module 2000-248 is available to receive data, port controller 4000-0 transmits a circuit set response to communications module 2000-0 and transmits the stored circuit setup request word to input port IP0 of network 5000. Port controller 4000-0 also modifies status word 31 to define destination channel 0 of link 3002-31 as unavailable and the communications module 2000-248 as unavailable to receive data. Communications module 2000-0 receives the circuit set response and begins to transmit data words in its associated source channel 0 of link 3001-0 to port controller 4000-0. Port controller 4000-0 also transmits these subsequent data words on to network 5000 input port IP0. Network 5000, which comprises eight time-slot interchangers 5100-0 through 5100-7 (FIG. 10), responds to the circuit setup request word by establishing a communication path via network 5000 output port OP31 and port controller 4000-31 to destination channel 0 of link 3002-31 and transmits the circuit setup request word and the subsequent data words thereon. Port controller 4000-31 responds to the circuit setup request word by transmitting a START RECEIVING DATA command followed by the subsequent data words via destination channel 0 of link 3002-31 to communications module 2000-248. Communications module 2000-248 responds to the START RECEIVING DATA command by storing each data word received in destination channel 0 of link 3002-31 for subsequent transmission to user device 1000-248.

Because of the operation of the port controllers 4000-0 through 4000-31 in conjunction with the distributed database of 32 status words, network 5000 only receives circuit setup request words defining destination channels that are available. Advantageously, network 5000 establishes a path in such manner that the circuit setup request word and each subsequent data word are conveyed thereon with no words being lost due to delay in establishing the path. Further, no network 5000 paths are established to communications modules that are occupied with other tasks, e.g., processing interrupts or checking the error check code of previously received data, and are therefore not yet available to receive data. Accordingly, flow control protocols are not required to assure that transmitted data is received since no data is transmitted until the availability of the destination channel and the availability of the destination communications module are assured.

After communications module 2000-0 has completed its data transmission to communications module 2000-248, communications module 2000-0 begins transmitting circuit disconnect request words defining destination channel 0 of link 3002-31, to port controller 4000-0. Port controller 4000-0 responds to one of the circuit disconnect request words by storing that circuit disconnect request word until status word 31, associated with destination channel 0 of link 3002-31 and communications module 2000-248, is again cycled to port controller 4000-0 for storage therein. Port controller 4000-0 then modifies status word 31 to define destination channel 0 of link 3002-31 as available. Port controller 4000-0 does not however modify status word 31 to define communications module 2000-248 as available to receive data. That is left for communications module 2000-248 to do. Port controller 4000-0 then transmits a circuit disconnected response to communications module 2000-0 and transmits the stored circuit disconnect request word on to input port IP0 of network 5000. Network 5000 responds by deallocating the path to destination channel 0 of link 3002-31 but not before the circuit disconnect request word is conveyed thereon to port controller 4000-31. Port controller 4000-31 responds to the circuit disconnect request word by transmitting a STOP RECEIVING DATA command to communications module 2000-248. In response to this command, communications module 2000-248 stops storing the data words received in destination channel 0 of link 3002-31 and transmits the stored data transmission from communications module 2000-0 to user device 1000-248. Only after communications module 2000-248 has completed its other tasks does it notify port controller 4000-31 that it is again available to receive data. Communications module 2000-248 transmits logic one receiver status bits in the digital words transmitted in source channel 0 of link 3002-31 as a receiver available signal. The next time status word 31 defining the availability of communications module 2000-248 to receive data is cycled to port controller 4000-31, that status word 31 is modified to define communications module 2000-248 as again available to receive data. Only then will a given communications module transmitting circuit setup request words defining communications module 2000-248 be successful in having a network 5000 path established to destination channel 0 of link 3002-31.

Network 5000 comprises eight time-slot interchangers 5100-0 through 5100-7 (FIG. 10). Each time-slot interchanger receives information from all 32 network 5000 input ports IP0 through IP31 but transmits information to only four of the 32 network 5000 output ports OP0 through OP31. Accordingly, a given time-slot interchanger, e.g., 5100-0, receives 256 digital words during a given frame (eight digital words from each of the port controllers 4000-0 through 4000-31) but is required to transmit only 32 digital words (eight digital words to each of the port controllers 4000-0 through 4000-3). A block diagram of time-slot interchanger 5100-0 is shown in FIG. 2. (A more detailed diagram of time-slot interchanger 5100-0 is shown in FIGS. 11 through 16, when arranged in accordance with FIG. 24). The digital words transmitted by port controllers 4000-0 through 4000-31 are received by a TSI input circuit 5200 including a triple-buffered memory arrangement. Digital words are stored in TSI input circuit 5200 during one frame, during the next frame any of those digital words that are circuit setup request words or circuit disconnect request words are used to appropriately change the contents of a control memory 5445 and then during a third frame up to 32 of those digital words are read from TSI input circuit 5200 and are transmitted via a register 5290 to be written in a TSI output circuit 5600. The reading of TSI input circuit 5200 and the writing of TSI output circuit 5600 are accomplished in accordance with source addresses and destination addresses transmitted from control memory 5445 via paths 5487 and 5488, respectively. TSI output circuit 5600 includes a double-buffered memory arrangement. Accordingly, digital words written into TSI output circuit 5600 during one frame are transmitted to port controllers 4000-0 through 4000-3 during the next frame.

In the present embodiment, a given port controller transmits at most one circuit setup request word or circuit disconnect request word to network 5000 during a given frame. Since TSI input circuit 5200 receives information from all 32 of the port controllers 4000-0 through 4000-31, TSI input circuit 5200 receives at most 32 circuit setup request or circuit disconnect request words during one frame. For each circuit setup request word defining a circuit to one of the communications modules 2000-0 through 2000-31 that is received during a given frame, a new connection word is stored in a new connection word storage arrangement 5410. (Recall that time-slot interchanger 5100-0 transmits information to only the 32 communications modules 2000-0 through 2000-31.) Each new connection word stored includes a source address defining the one out of 256 communications modules that has initiated the circuit setup request and a destination address that defines the one out of 32 possible communications modules that is the requested destination. For each circuit disconnect request word defining a circuit to one of the communications modules 2000-0 through 2000-31 that is received during the given frame, a disconnection word is stored in a disconnection word storage arrangement 5460. Each disconnection word defines one of the 32 possible destination communications modules 2000-0 through 2000-31 that is to be disconnected. During the next frame, the disconnection words stored in arrangement 5460 are used to address a disconnect memory arrangement 5490 having locations associated with each of the 32 communications modules 2000-0 through 2000-31. Logic one signals are stored in each addressed location indicating that the path to the associated communications module is to be disconnected.

Control memory 5445 comprises 32, fifteen-bit connection word storage registers: an input register 5446-0, 30 intermediate registers 5446-1 through 5446-30 and an output register 5446-31. Thirty-two times during each frame, the contents of the registers 5446-0 through 5446-31 are shifted by one register in response to a clock signal X1 (FIG. 20). Each register 5446-0 through 5446-31 stores one digital word comprising a six-bit destination address (bits 0 through 5) and a nine-bit source address (bits 6 through 14). If a digital word stored in control memory 5445 has a logic one in bits 0 and 6 it is a connection word, i.e., it represents an established connection. Otherwise, it is a null word representing no established connection. For connection words, bits 1 through 5 define one of 32 locations of TSI output circuit 5600 associated with the 32 destination communications modules 2000-0 though 2000-31 and bits 7-14 define one of 256 locations of TSI input circuit 5200 associated with the 256 source communications modules 2000-0 through 2000-255. When a given connection word is stored in register 5446-30 on the clock signal X1, the source address of that connection word is transmitted to TSI input circuit 5200 via path 5487 and the digital word stored in the TSI input circuit 5200 location defined by that source address is read and stored in register 5290 on a clock signal X2 (FIG. 20). When the given connection word is then shifted to output register 5446-31 on the next clock signal X1, the destination address of that connection word is transmitted to TSI output circuit 5600 via path 5488 and the digital word stored in register 5290 is written into TSI output circuit 5600 at the location defined by that destination address. Since TSI output circuit 5600 includes a double-buffered memory arrangement, digital words written into TSI output circuit 5600 during one frame are not transmitted until the following frame and the sequential order in which transfers from TSI input circuit 5200 to TSI output circuit 5600 occur is unimportant. Accordingly, connection words may be stored in any sequential order in control memory 5445.

When the given connection word is stored in register 5446-30, the destination address of that connection word is transmitted to disconnect memory arrangement 5490 and the bit stored in the location thus addressed is read and stored in a one-bit disconnect register 5495 on clock signal X2. Therefore, when the given connection word is shifted to output register 5446-31 on the next clock signal X1, the bit present in register 5495 indicates whether the connection represented by the given connection word is to remain connected or to be disconnected during the next frame. The bit stored in register 5495 together with bit 0 of the digital word in output register 5446-31 and bit 0 of a new connection word available on a bus 5440 from new connection word storage arrangement 5410 are the three input signals to a select logic circuit 5496. A logic one in bit 0 of output register 5446-31 indicates that the digital word stored therein is a connection word rather than a null word. A logic one bit stored in register 5495 indicates that the connection represented by the connection word stored in register 5446-31 is to be disconnected during the next frame. A logic one on bit 0 of bus 5440 indicates that there is a new connection word available to be stored in control memory 5445. Select logic circuit 5496 transmits signals to control three enable gates 5443, 5441 and 5444 in accordance with the truth table given in FIG. 22. When a null word is present in output register 5446-31 and bit 0 of bus 5440 indicates that there is a new connection word available to be stored in control memory 5445, i.e., there is a new connection to be established, select logic circuit 5496 transmits a logic one signal to enable gate 5441 and the new connection word is transmitted via enable gate 5441 and a control memory input path 5447 and stored by input register 5446-0 on the next clock signal X1. When bit 0 of bus 5440 indicates that there is no new connection word available, select logic circuit 5496 transmits a logic one signal to enable gate 5443 and a null word comprising all logic zero bits is transmitted via enable gate 5443 from a zero register 5442 and stored by input register 5446-0 on the next clock signal X1. When a connection word rather than a null word is present in output register 5446-31 and the bit in register 5495 indicates that the connection is not to be disconnected, select logic circuit 54496 transmits a logic one signal to enable gate 5444 and the connection word stored in output register 5446-31 is shifted via enable gate 5444 to input register 5446-0 on the next clock signal X1. However, when the bit in register 5495 indicates that the connection is to be disconnected and bit 0 of bus 5440 indicates that there is a new connection word available to be stored in control memory 5445, i.e., there is a new connection to be established, select logic circuit 5496 transmits a logic one signal to enable gate 5441 and the new connection word is transmitted via enable gate 5441 and stored by input register 5446-0 on the next clock signal X1. Finally, when the bit in register 5495 indicates that the connection is to be disconnected but bit 0 of bus 5440 indicates that there is no new connection word available to be stored in control memory 5445, select logic circuit 5496 transmits a logic one signal to enable gate 5443 and a null word comprising all logic zero bits is transmitted via enable gate 5443 from zero register 5442 and stored by input register 5446-0 on the next clock signal X1.

Control memory 5445 is a sequential access memory rather than a random access memory and is in effect a circulating, multiple-bit shift register wherein the information to be transmitted to input register 5446-0 via control memory input path 5447 is selected by select logic circuit 5496. In the present exemplary embodiment, each connection word (or null word) received on control memory input path 5447 is stored in control memory 5445 for one frame. Since the transmission of source and destination addresses from control memory 5445 to control the transfer of digital words from TSI input circuit 5200 to TSI output circuit 5600 occurs substantially simultaneously with the transmission of connection words (or null words) for storage in input register 5446-0, digital words are transferred at a relatively higher rate in time-slot interchanger 5100-0 than in a time-slot interchanger utilizing a random access control memory arrangement of comparable technology but having alternate read and write access. Advantageously, control memory 5445 can disconnect 32 active connections and establish 32 new connections within any given frame.

DETAILED DESCRIPTION

Certain of the elements of the fast circuit switching system of FIG. 1 are now described in more detail.

Communications Module 2000-0

Communications module 2000-0 (FIG. 3) comprises a user buffer 2003 for storing data for communication with user device 1000-0, a processor 2004 and a memory 2002 interconnected by a bus 2001. Information in memory 2002 is conveyed to multiplexer/demultiplexer 3000-0 via a direct memory access device 2005 and a DMA transmit control circuit 2006. Information from multiplexer/demultiplexer 3000-0 is conveyed to memory 2002 via a DMA receive control circuit 2007 and direct memory access device 2005.

As an example consider that processor 2004 determines that a given block of data, e.g., 100 eight-bit bytes, received from user device 1000-0 via user buffer 2003 and stored in memory 2002 is to be transmitted to user device 1000-248. Processor 2004 transmits a START command via bus 2001 to DMA transmit control circuit 2006, which command indicates that the data is to be transmitted to destination channel 0 of link 3002-31 for communication via communications module 2000-248 to user device 1000-248. Processor 2004 also notifies DMA transmit control circuit 2006 of the size of the data block. Circuit 2006 has four operating states as shown in the state diagram of FIG. 21. Assuming that circuit 2006 is in the READY state, i.e., it is not involved in transmitting other data, it changes to the SETUP state in response to the START command and transmits a given circuit setup request word defining channel 0 of link 3002-31 as the requested destination. The given circuit setup request word is transmitted by multiplexer/demultiplexer 3000-0 in source channel 0 of link 3001-0 to port controller 4000-0. Until DMA receive control circuit 2007 receives a circuit set response from port controller 4000-0 in destination channel 0 of link 3002-0 and informs circuit 2006 thereof via a path 2008, circuit 2006 remains in the SETUP state. In other words, when DMA receive control circuit 2007 receives either no response or destination busy responses in destination channel 0 of link 3002-0, DMA transmit control circuit 2007 remains in the SETUP state and repetitively transmits the given circuit setup request word in source channel 0 of link 3001-0. Upon being informed by circuit 2007 via path 2008 of the receipt of a circuit set response, circuit 2006 changes to the TRANSFER state and transmits a signal via a path 2009 to direct memory access device 2005 which, in response to the signal, begins reading the data block in memory 2002 and transmitting that data via multiplexer/demultiplexer 3000-0 in source channel 0 of link 3001-0 at the rate of two bytes, i.e., 16 bits, per frame.

Recall that processor 2004 notified circuit 2006 of the length of the data block in memory 2002. When the entire block has been transmitted, circuit 2006 changes to the DISCONNECT state and transmits a circuit disconnect request word again defining destination channel 0 of link 3002-31. The circuit disconnect request word is transmitted in source channel 0 of link 3001-0 to port controller 4000-0. When circuit 2007 receives a circuit disconnected response in destination channel 0 of link 3002-0 and notifies circuit 2006 via path 2008, circuit 2006 returns to the READY state where it is available to transmit another data block.

DMA transmit control circuit 2006 is also used to inform port controller 4000-0 that communications module 2000-0 is available to receive data on destination channel 0 of link 3002-0. When processor 2004 determines that circuit 2007 and direct memory access device 2005 are prepared to transfer incoming data from link 3002-0 to memory 2002 for storage therein, processor 2004 so notifies circuit 2006 which transmits logic one receiver status bits (bit 0, FIG. 17) in source channel 0 of link 3001-0 thereby informing port controller 4000-0 that communications module 2000-0 is ready to receive data from destination channel 0 of link 3002-0. In response, port controller 4000-0 modifies status word 0 defining the availability of communications module 2000-0 to receive data, the next time that status word 0 is cycled to port controller 4000-0.

DMA receive control circuit 2007, in addition to detecting circuit set, circuit disconnected and destination busy responses in destination channel 0 of link 3002-0 and notifying circuit 2006 thereof via path 2008 as described above, detects the START RECEIVING DATA and STOP RECEIVING DATA commands (FIG. 18) with regard to the transmission of data to communications module 2000-0 from another communications module of the system. When circuit 2007 detects a START RECEIVING DATA command from destination channel 0 of link 3002-0, circuit 2007 notifies direct memory access device 2005 via a path 2010. Circuit 2007 then begins transferring the 16-bit data field of each data word subsequently received in that destination channel, to direct memory access device 2005 for storage in memory 2002. When circuit 2007 subsequently detects a STOP RECEIVING DATA command in that destination channel, circuit 2007 stops transferring data for storage in memory 2002 and notifies processor 2004 and direct memory access device 2005 that a complete data block has been received and stored in memory 2002. In response, processor 2004 initiates the transfer of the data block to user buffer 2003 for communication to user device 1000-0.

Port Controller 4000-0

Port controller 4000-0, shown in FIGS. 4 through 9, arranged in accordance with FIG. 23, includes a port input circuit 4100, a port control circuit 4300 and a port output circuit 4500. The functions of port controller 4000-0 are to detect circuit setup request and circuit disconnect request words received in source channels of link 3001-0 and to transmit received circuit setup request words and subsequent data words to network 5000 input port IPO only after the status word defining the availability of the requested destination channel and the availability of the destination communications module to receive data, has been cycled to port controller 4000-0 and that status word indicates both that the requested destination channel is available and that the destination communications module is available to receive data. Port controller 4000-0 appropriately modifies the status word before transmitting it on to port controller 4000-1. Port controller 4000-0 transmits circuit set or destination busy responses in destination channels on link 3002-0 in response to circuit setup request words received in source channels on link 3001-0. Port controller 4000-0 transmits circuit disconnected responses in destination channels on link 3002-0 and appropriately modifies status words in response to circuit disconnect request words received in source channels on link 3001-0. Port controller 4000-0 transmits received circuit disconnect request words on to network 5000 input port IPO. Port controller 4000-0 modifies status words in response to receiver available signals received in source channels on link 3001-0 indicating that the communications modules associated with those source channels are available to receive data. Finally, port controller 4000-0 responds to circuit setup request and circuit disconnect request words received from network 5000 output port OPO by transmitting START RECEIVING DATA and STOP RECEIVING DATA commands, respectively, to multiplexer/demultiplexer 3000-0 in destination channels on link 3002-0.

Port controller 4000-0 operates in frames of eight channels or time slots each. Six clock signals C0 through C5 (FIG. 19), which are used within port controller 4000-0 for timing purposes, all are of a frequency of one pulse per time slot. During each time slot, a 19-bit digital word (FIG. 17) is serially received on link 3001-0 by serial-parallel register 4101. That digital word is stored in a 19-bit register 4103 on the clock signal C0. Clock signal C0 is also used to increment a three-bit time-slot counter 4115 and a modulo-9 counter 4129. Time-slot counter 4115 repetitively generates the three-bit time-slot designations 000 through 111 representing the channels 0 through 7 of link 3001-0 from which the digital words stored in register 4103 are received. Modulo-9 counter 4129 generates logic one signals on conductors 4130 and 4131 during every ninth time slot (FIG. 19). The logic one signal on conductor 4130 occurs one time slot after the logic one signal on conductor 4131. To simplify the implementation of both port controller 4000-0 and network 5000, at most one circuit setup request or circuit disconnect request word on link 3001-0 will be processed by port controller 4000-0 during each frame. Modulo-9 counter 4129 is used in a manner akin to that of a stroboscope such that when a circuit setup request or circuit disconnect request word received in channel 0 of a given frame is processed by port controller 4000-0, a circuit setup request or circuit disconnect request word received in channel 1 of the next frame will be processed etc. Accordingly, a given communications module may transmit circuit setup request or circuit disconnect request words in at most eight consecutive frames before one such word is processed by port controller 4000-0.

As an example, assume that a given circuit setup request word defining destination channel 0 of link 3002-31 is received in source channel 0 of link 3001-0 during a frame when modulo-9 counter 4129 transmits a logic one signal on conductor 4130 during time slot 0. A decoder 4105, which receives bits 1 and 2 of each digital word stored in register 4103, determines that the word presently stored in register 4103 is a circuit setup request word and transmits a logic one signal on a conductor 4106 to an AND gate 4111. The logic one signal generated by modulo-9 counter 4129 on conductor 4130 is transmitted to an AND gate 4113, which receives at its other input terminal the clock signal C1. On clock signal C1, AND gate 4113 transmits a logic one signal to AND gate 4111, which transmits a logic one signal to an 18-bit register 4109 and a three-bit register 4117 since it is receiving the logic one signal on conductor 4106 from decoder 4105 on its other input terminal. In response to the logic one signal from AND gate 4111, register 4109 stores bits 1 through 18 of the given circuit setup request word present in register 4103 and register 4117 stores the time-slot designation 000 representing time slot 0 being generated by time-slot counter 4115. The words stored in registers 4109 and 4117 will remain there for nine time slots until modulo-9 counter 4129 again generates a logic one signal on conductor 4130. The logic one signal on conductor 4130 is transmitted to an AND gate 4151, which receives the clock signal C0 at its other input terminal. On the clock signal C0 nine time slots later, AND gate 4151 transmits a logic one signal to clear registers 4109 and 4117.

The words stored in registers 4109 and 4117 on the clock signal C1 are conveyed to port control circuit 4300. As will be described further herein, during the next seven time slots, each of the 32 status words 0 through 31 defining the availability of destination channels and the availability of destination communications modules to receive data, is cycled to port controller 4000-0 at least once. When status word 31 associated with the destination communication module 2000-248 is cycled to port controller 4000-0, either a flip-flop 4371-S or a flip-flop 4372-B is set. Flip-flop 4371-S is set if status word 31 indicates both that destination channel 0 of link 3002-31 is available and that communications module 2000-248 is available to receive data. Otherwise, flip-flop 4372-B is set. The output signal generated by flip-flop 4371-S is transmitted to an AND gate 4381-S. The other input terminal of AND gate 4381-S is connected to an AND gate 4375. AND gate 4375 receives at its two input terminals the clock signal C3 and the logic signal transmitted on conductor 4131 by modulo-9 counter 4129. Accordingly, if flip-flop 4371-s is set indicating that the requested circuit is to be established, on the clock signal C3 of the eighth time slot following the storage of the given circuit setup request word in register 4109, AND gate 4381-S transmits a logic one signal via an OR gate 4385 to a data selector 4119 and an address selector 4123, and via an additional OR gate 4125 to a WRITE input terminal of an 8×18 (8 locations of 18 bits each) random access memory 4127. Data selector 4119 and address selector 4123 as well as other data selectors and address selectors described herein operate as follows. When a logic one signal is transmitted to the upper input terminal on the left-hand side of data selector 4119, the data present at the left input terminal on the upper side of data selector 4119 is transmitted to the DATA IN terminal of memory 4127. When a logic one signal is transmitted to the lower input terminal on the left-hand side of data selector 4119, the data present at the right input terminal on the upper side of data selector 4119 is transmitted to the DATA IN terminal of memory 4127. Similarly, when a logic one signal is transmitted to the upper input terminal on the left-hand side of address selector 4123, the address present at the left input terminal on the upper side of address selector 4123 is transmitted to the ADDRESS terminal of memory 4127. When a logic one signal is transmitted to the lower input terminal on the left-hand side of address selector 4123, the address present at the right input terminal on the upper side of address selector 4123 is transmitted to the ADDRESS terminal of memory 4127. Accordingly, when AND gate 4381-S transmits the logic one signal indicating that the requested circuit is to be established, the given circuit setup request word present in register 4109 is stored in memory 4127 at location 000 as defined by the time-slot designation stored in register 4117.

An 8×1 random access, status memory 4303 included in port control circuit 4300 stores a bit in each of its eight locations indicating whether circuits have been established from the eight source channels on link 3001-0 via network 5000 to destination channels. A logic one bit indicates that a circuit has been established. When AND gate 4381-S generates the logic one signal in response to the given circuit setup request word, that logic one signal is also conveyed via OR gate 4385 to the WRITE terminal of status memory 4303 and to an input terminal of an address selector 4301. The logic one signal was also directly transmitted to the DATA IN terminal of status memory 4303. Accordingly, a logic one bit indicating that a circuit has been established from source channel 0 of link 3001-0 is stored in status memory 4303 location 000 as defined by the time-slot designation stored in register 4117.

If a given circuit disconnect request word is stored in register 4103 during time slot 0 rather than the given circuit setup request word, decoder 4105 again transmits a logic one signal on conductor 4106 and the given circuit disconnect request word and the time-slot designation 000 are stored in registers 4109 and 417. When status word 31 associated with communications module 2000-248 is cycled to port controller 4000-0, a flip-flop 4373-D is set and an AND gate 4383-D transmits a logic one signal via OR gate 4385 to data selector 4119 and address selector 4123 and via OR gate 4125 to the WRITE terminal of memory 4127. Accordingly, the given circuit disconnect request word is stored in memory 4127 location 000. Further, the logic one signal generated by AND gate 4383-D is transmitted via OR gate 4385 to address selector 4301 and to the WRITE terminal of status memory 4303. However, in this case, flip-flop 4371-S is not set and AND gate 4381-s transmits a logic zero signal to the DATA IN terminal of status memory 4303. Therefore, a logic zero bit is stored in status memory 4303 location 000 indicating that a circuit from source channel 0 of link 3001-0 is not presently established.

On the clock signal C1 during each time slot, the bit stored in the status memory 4303 location associated with that time slot as defined by the time-slot designation transmitted by time-slot counter 4115 is read and stored in a flip-flop 4305. When during a given time slot, e.g., time sot 3, a logic one bit, stored in flip-flop 4305 indicating that a circuit is presently established from source channel 3 of link 3001-0, is transmitted to an AND gate 4108 and decoder 4105 also transmits a logic one signal on conductor 4107 indicating that the word presently stored in register 4103 is a data word rather than a circuit setup request or circuit disconnect request word, AND gate 4108 transmits, on the clock signal C2, a logic one signal to an input terminal of data selector 4119, via an OR gate 4121 to an input terminal of address selector 4123 and via OR gate 4125 to the WRITE terminal of memory 4127. In response, the data word present in register 4103 is written into memory 4127 location 011 as defined by the time-slot designation 011 generated by time-slot counter 4115 during time slot 3.

On the clock signal C4 during each time slot, the 18-bit word stored in the memory 4127 location defined by time-slot counter 4115 is read and stored on the clock signal C5 in a parallel-serial register 4128. The stored 18-bit word is then transmitted serially to network 5000 input port IPO. Memory 4127 is a destructive read memory. Therefore after each memory 4127 location is read, 18 logic zero bits are stored in that memory 4127 location. Further, on the clock signal C5 of each time slot, flip-flop 4305 is reset. Status memory 4303 is not a destructive read memory. Therefore, once a logic one bit has been written in status memory 4303 indicating that a circuit has been established, the logic one bit remains therein until being overwritten by a logic zero bit indicating that the circuit has been disconnected.

Recall that a given circuit setup request or circuit disconnect request word and its associated time-slot designation, once stored in registers 4109 and 4117 respectively, remain therein for nine time slots. Now assume that a given circuit setup request word defining destination channel 0 of link 3002-31 is received in source channel 0 on line 3001-0 and that the given circuit setup request word and the source channel time-slot designation 000 are stored in registers 4109 and 4117. Port control circuit 4300 of port controller 4000-0 includes a 17-bit status word receive register 4341 for storing status words received from port controller 4000-31 and a 17-bit status word transmit register 4342 for storing modified status words to be transmitted on to port controller 4000-1. The status word present in the status word transmit register 4342 of port controller 4000-31 is stored in the status word receive register 4341 of port controller 4000-0 during each occurrence of a clock signal K0. The status word present int the status word receive register 4341 of port controller 4000-0 is modified and stored in the status word transmit register 4342 of port controller 4000-0 during each occurrence of a clock signal K1. In the present embodiment, the clock signals K0 and K1 are both of a frequency of five pulses per link 3001-0 time slot (FIG. 19). Accordingly each of the 32 status words is cycled to port controller 4000-0 once in a period les than seven time slots.

The mechanism for cycling status words can be equivalently described as follows. Assume that j, k and l are defined as integers with k being the integer resulting from the modulo-32 addition of one to the integer j and with l being the integer resulting from the modulo-32 addition of one to the integer k. For any integer j from 0 through 31, the status word transmit register 4342 of the kth port controller (4000-k) transmits each status word stored by the status word receive register 4341 of the kth port controller (4000-k) to the lth port controller (4000-l). Further, the status word receive register 4341 of the kth port controller (4000-k) receives associated communications modules to receive data. Bit 16 is a logic zero bit in the other 31 status words. A loop counter 4329 which is incremented on each clock signal K0, generates five-bit status word designations from 00000 to 11111. Loop counter 4329 is reset by the logic one bit in bit 16 of status word 0. Accordingly, when status word 0 is present in status word receive register 4341, loop counter 4329 generates the status word designation 00000, when status word 1 is present in register 4341, loop counter 4329 generates the status word designation 00001, etc. Finally, when status word 31 is present in register 4341, loop counter 4329 generates the status word designation 11111. In the present example, bits 11–15 of the given circuit setup request word are the bits 11111 defining link 3002-31 as the requested destination link. Decoder 4311, which receives bits 1 and 2 of the digital word stored in register 4109, determines that the stored digital word is a circuit setup request word and transmits a logic one signal via a conductor 4310 and an OR gate 4317 to an AND gate 4319. During the same time slot that the given circuit setup request word was stored in register 4109 on the clock signal C1, the logic one signal generated by modulo-9 counter 4129 is transmitted on conductor 4130 to AND gate 4319. AND gate 4319 receives at a third input terminal the clock signal C2. Accordingly on the clock signal C2 of that same time slot, AND gate 4319 transmits a logic one signal to set a flip-flop 4321 to enable a comparator 4323. Comparator 4323 compares the status word designations generated by loop counter 4329 with the bits 11–15 of the given circuit setup request word stored in register 4109. When status word 31 is cycled to status word receive register 4341 as indicated by loop counter 4329 generating the designation 11111, comparator 4323 generates a logic one signal indicating that the status word relevant to the circuit setup request word being processed is now present in status word receive register 4341. The logic one signal generated by comparator 4323 is transmitted to three AND gates 4351, 4353 and 4355 of a logic circuit 4350-0 and to similar AND gates included in seven other logic circuits 4350-1 through 4350-7. Bits 16 through 18 of the given circuit setup request word stored in register 4109 are transmitted to a 1-out-of-8 selector 4331 which transmits a logic one signal on the one of eight conductors SEL0 through SEL7 defined by those bits. In the present example, since the requested destination channel is channel 0, a logic one signal is transmitted on conductor SEL0 to the three AND gates 4351, 4353 and 4355 of the logic circuit 4350-0 only. During the same time slot that the given circuit setup request word was stored in register 4109, i.e., time slot 0, the bit stored in status memory 4303 location 000 was read and stored in no circuit from the source channel transmitting that circuit setup request word has presently been established.

If bits 0 and 8 of status word 31, which is presently stored in status word receive register 4341, are both logic ones indicating both that destination channel 0 of link 3002-31 is available and that communications module 2000-248 is available to receive data, the AND gate 4351 of logic circuit 4350-0 transmits a logic one signal via an eight-input OR gate 4361-S to set flip-flop 4371-S. Recall that setting flip-flop 4371-S results in the given circuit setup request word being stored in memory 4127 location 000 and a logic one bit, indicating that a circuit from source channel 0 of line 3001-0 has been established, being stored in status memory 4303 location 000. OR gate 4361-S receives at its eight input terminals the logic signals transmitted by AND gate 4351 of logic circuit 4350-0 and by similar AND gates in the other seven logic circuits 4350-7. If either bit 0 or bit 8 of status word 31 is a logic zero indicating that either destination channel 0 of link 3002-31 is unavailable or that communications module 2000-248 is not available to receive data, a NAND gate 4352 transmits a logic one signal to the AND gate 4353 of logic circuit 4350-0 and that AND gate 4353 transmits a logic one signal via an eight-input OR gate 4362-B to set flip-flop 4372-B. As will be discussed herein, setting flip-flop 4372-B results in a destination busy response being transmitted in destination channel 0 of link 3002-0 to communications module 2000-0. OR gate 4362-B receives at its eight input terminals the logic signals transmitted by AND gate 4353 of logic circuit 4350-0 and by similar AND gates in the other seven logic circuits 4350-1 through 4350-7.

Since the digital word stored in register 4109 is a circuit setup request word rather than a circuit disconnect request word, decoder 4311 transmits a logic zero signal on a conductor 4312 to an AND gate 4315-DR and accordingly AND gate 4315-DR transmits a logic zero signal to the AND gate 4355 of logic circuit 4350-0 and to similar AND gates in the logic circuits 4350-1 through 4350-7. In response, AND gate 4355 transmits a logic zero signal to an OR gate 4356. A comparator 4327 compares the status word designations generated by loop counter 4329 with the contents of a five-bit ID register that defines the one of the 32 port controllers 4000-0 through 4000-31 in which it is included. In port controller 4000-0 presently being described, ID register contains the bits 00000. Accordingly, when status word 31 is present in register 4341 as indicated by loop counter 4329 generating the status word designation 11111, comparator 4327 transmits a logic zero signal to an AND gate 4357 in logic circuit 4350-0 and to similar AND gates in logic circuits 4350-1 through 4350-7. In response, AND gate 4357 transmits a logic zero signal to an OR gate 4359. When bits 0 and 8 in status word receive register 4341 are both logic ones and AND gate 4351 therefore transmits a logic one signal to inverting input terminals of AND gates 4354 and 4358, AND gates 4354 and 4358 transmit logic zero signals to OR gates 4356 and 4359 respectively. Since both OR gates 4356 and 4359 are also receiving logic zero signals at their other input terminals, they both transmit logic zero signals for storage in bits 0 and 8 of status word transmit register 4342 on the clock signal K1. Accordingly, whenever AND gate 4351 generates a logic one indicating that the requested connection is being established, bits 0 and 8 of the status word in register 4341 are forced to logic zeroes when stored in register 4342. In the case that bits 0 and 8 of status word 31 present in register 4341 are not both logic ones, AND gate 4351 transmits a logic zero signal to the inverting input terminals of AND gates 4354 and 4358 and accordingly the bits 0 and 8 of register 4341 are conveyed without modification via AND gate 4354 and OR gate 4356 and via AND gate 4358 and OR gate 4359 for storage in bits 0 and 8 of register 4342 on the clock signal K1.

When the digital word received in source channel 0 of link 3001-0 and stored in register 4109 is a circuit disconnect request word defining destination channel 0 of link 3002-31, decoder 4311 transmits a logic one signal on conductor 4312 which is conveyed via OR gate 4317 to AND gate 4319, which again results in flip-flop 4321 being set and comparator 4323 being enabled. In this case assume that a logic one bit indicating that a circuit from source channel 0 of link 3001-0 is presently established, is present in status memory 4303 location 000. When the bit in that location is read and stored in flip-flop 4309, flip-flop 4309 transmits a logic one signal from its "1" output terminal to AND gate 4315-DR. AND gate 4315-DR receives at its other input terminal the logic one signal transmitted by decoder 4311 on conductor 4312. In response, AND gate 4315-DR transmits a logic one signal to the AND gate 4355 in logic circuit 4350-0 and to similar AND gates in the other logic circuits 4350-1 through 4350-7. In logic circuit 4350-0 only, AND gate 4355 transmits a logic one signal via an eight-input OR gate 4363-D to set a flip-flop 4373-D. Recall that setting flip-flop 4373-D results in the circuit disconnect request word present in register 4109 being written into memory 4127 location 000 and a logic zero bit being stored in status memory 4303 location 000 indicating that the circuit from source channel 0 of link 3001-0 has been disconnected. OR gate 4363-D receives at its eight input terminals the logic signals transmitted by AND gate 4355 of logic circuit 4350-0 and by similar AND gates in logic circuits 4350-1 through 4350-7. A logic one signal being generated by any one of the OR gates 4361-S, 4362-B and 4363-D effects a transmission of a logic one signal by an OR gate 4365 to reset flip-flop 4321 and thereby disable comparator 4323.

When AND gate 4355 transmits a logic one signal indicating that the requested circuit disconnection is to be effected, that logic one signal is conveyed via OR gate 4356 for storage in bit 0 of register 4342 on the clock signal K1. The logic one in bit 0 indicates that destination channel 0 of link 3002-0 is again available.

Recall that a given communications module, e.g., 2000-0, notifies port controller 4000-0 that it is again available to receive data by transmitting logic one receiver status bits (bit 0, FIG. 17) in source channel 0 of link 3001-0. Bit 0 of each digital word received serially on link 3001-0 by serial-parallel register 4101 and stored in register 4103 is transmitted to eight AND gates 4335-0 through 4335-7. The time-slot designations generated by time-slot counter 4115 are transmitted to a 1-out-of-8 selector which transmits a logic one signal on the one of eight conductors S0 through S7 thus defined. When a logic one receiver status bit is received in time slot 0 on link 3001-1 and that logic one bit and the logic one signal generated by selector 4333 on conductor S0 are both conveyed to AND gate 4335-0, AND gate 4335-0 transmits a logic one signal to set a flip-flop 4337-0. Similarly, when logic one receiver status bits are received in time slots 1 through 7 on link 3001-0, flip-flops 4337-1 through 4337-7 are set. A given flip-flop, e.g., 4337-0, is not reset until eight time slots later when selector 4333 transmits a logic one signal on conductor S7 to reset flip-flop 4337-0. Similarly, flip-flop 4337-7 is reset when selector 4333 transmits a logic one signal on conductor S6. Accordingly, the signals stored by the flip-flops 4337-0 through 4337-7 define the availability of the communications modules 2000-0 through 2000-7 as indicated by the most recently received receiver status bits.

Recall that ID registers 4325 defines the one of 32 port controllers 4000-0 through 4000-31 in which it is included. In port controller 4000-0, comparator 4327 generates a logic one signal only when status word 0 is present in status word receive register 4341. The logic one signal is transmitted to AND gate 4357 in logic circuit 4350-0 and to similar AND gates in logic circuits 4350-1 through 4350-7. The bit stored in flip-flop 4337-0 is transmitted via a conductor A0 to AND gate 4357 in logic circuit 4350-0. The bits stored in the other flip-flops 4337-1 through 4337-7 are conveyed by conductors A1 through A7 to similar AND gates in logic circuits 4350-1 through 4350-7. Bit 0 of the status word present in status word receive register 4341 is also transmitted to AND gate 4357 in logic circuit 4350-0. When bit 0 of status word 0 present in register 4341 is a logic one indicating that destination channel 0 of link 3002-0 is available and the bit stored in flip-flop 4337-0 indicates that communications module 2000-0 is available to receive data, AND gate 4357 transmits a logic one signal via OR gate 4359 for storage in bit 8 of status word transmit register 4342 on the clock signal K1. Accordingly status word 0 is modified by storing the logic one in bit 8 to indicate that communications module 2000-0 is available to receive data.

Recall that for each circuit setup request or circuit disconnect request word stored in register 4109, one of the flip-flops 4371-S, 4373-D and 4372-B is set in response some time during the next seven time slots. Modulo-9 counter 4129 transmits a logic one signal on conductor 4131 to AND gates 4375 and 4371 during the eighth subsequent time slot. AND gate 4375 receives at its other input terminal the clock signal C3. Accordingly on the clock signal C3 of the eighth subsequent time slot, AND gate 4375 transmits a logic one signal to the three AND gates 4381-S, 4383-D and 4382-B which receive at their other input terminals the signals stored at the "1" output terminals of flip-flops 4371-S, 4373-D and 4372-B. Accordingly, for any one of the flip-flops 4371-S, 4373-D and 4372-B that has been set, the associated one of the AND gates 4381-A, 4383-D and 4382-B transmits a logic one signal to an encoder 4513 and an OR gate 4515 in port output circuit 4500. AND gate 4371 receives at its other input terminal the clock signal C4. On the clock signal C4 of the eighth subsequent time slot, AND gate 4371 transmits a logic one signal to reset flip-flop 4309 and flip-flops 4371-S, 4373-D and 4372-B.

When one of the AND gates 4381-S, 4383-D and 4382-B transmits a logic one signal to OR gate 4515, OR gate 4515 transmits a logic one signal to the WRITE terminal of an 8×2 random access memory 4509 and to an address selector 4517. The memory 4509 location addressed is defined by the time-slot designation stored in register 4117. Consistent with the previous example where the circuit setup request word or circuit disconnect request word stored in register 4109 was received in source channel 0 of link 3001-0, the time-slot designation 000 is stored in register 4117 and memory 4509 location 000 is addressed. When AND gate 4381-S transmits a logic one signal to encoder 4513, encoder 4513 transmits the circuit set response bits 01 (FIG. 18) for storage in memory 4509 location 000. When AND gate 4383-D transmits a logic one signal to encoder 4513, encoder 4513 transmits the circuit disconnected response bits 10 (FIG. 18) for storage in memory 4509 location 000. And when AND gate 4382-B transmits a logic one signal to encoder 4513, encoder 4513 transmits the destination busy response bits 11 (FIG. 18) for storage in memory 4509 location 000. Memory 4509 is thus written with response bits on the clock signal C3 of the eighth time slot after a given circuit setup request or circuit disconnect request word is stored in register 4109.

Eighteen-bit digital words are received serially from network 5000 output port OP0 by a serial-parallel register 4501. When a given digital word received by serial-parallel register 4501 is a circuit setup request word that has been conveyed through network 5000, an encoder 4503 transmits the bits representing a START RECEIVING DATA command (FIG. 18) to a register 4505. If the digital word received by register 4501 is a circuit disconnect request word, encoder 4503 transmits the bits representing a STOP RECEIVING DATA command (FIG. 18) to register 4505. Finally, if the digital word received by register 4501 is a data word, encoder transmits a logic one in bit 2 indicating data rather than command together with the 16-bit data field to register 4505. The information transmitted by encoder 4503 is stored in register 4505 on the clock signal C3. A time-slot counter 4511, which is incremented on the clock signal C2, repetitively generates the time-slot designations 000 through 111 representing the destination channels on link 3002-0. The contents of register 4505 are stored in the location of an 8×17 random access memory 4507 defined by time-slot counter 4511 on the clock signal C4 of each time slot. The contents of memory 4509 and memory 4507 locations defined by time-slot counter 4511 are read therefrom on the clock signal C1 of each time slot and stored as bits 0 through 18 in a parallel-serial register 4519 on the clock signal C2. Each 19-bit word thus stored is subsequently serially transmitted on link 3002-0 to multiplexer/demultiplexer 3000-0.

Network 5000

Network 5000 comprises eight time-slot interchangers 5100-0 through 5100-7 (FIG. 10). Each time-slot interchanger receives information from all 32 network 5000 input ports IP0 through IP31 but transmits information to only four of the 32 network 5000 output ports OP0 through OP31. Accordingly, a given time-slot interchanger, e.g., 5100-0, receives 256 digital words during a given frame (eight digital words from each of the port controllers 4000-0 through 4000-31) but is required to transmit only 32 digital words (eight digital words to each of the port controllers 4000-0 through 4000-3). Network 5000 further includes eight, 3-bit ID registers 5900-0 through 5900-7 each associated with one of the time-slot interchangers 5100-0 through 5100-7. ID register 5900-0 contains the bits 000 defining time-slot interchanger 5100-0 as the time-slot interchanger that transmits information to output ports OP0 through OP3, ID register 5900-1 contains the bits 001 defining time-slot interchanger 5100-1 as the time-slot interchanger that transmits information to output ports OP4 through OP7, etc.

FIG. 20 is a timing diagram showing various clock signals required within network 5000. Since the time-slot interchangers 5100-0 through 5100-7 included pipelined memory arrangements, a number of clock signals are used for frame definition. Clock signals S0, S1, SO' and S1' are used to define alternate frames. Clock signals T0, T1 and T2 define first, second and third frames. Digital words are received at a given input port at a rate of eight digital words per frame corresponding to the eight source channels on each of the links 3001-0 through 3001-31. However, within a given time-slot interchanger, 32 digital word transfers are completed each frame. Accordingly, each frame is herein defined as being divided into eight link time slots and further divided into 32 TSI time slots. Each of the clock signals Y0 and Y1 are of a frequency of one pulse per link time slot. Each of the clock signals X0, X1 and X2 are of a frequency of one pulse per TSI time slot, or equivalently, four pulses per link time slot. The transitions of the clock signals S0' and S1' are delayed by one TSI time slot from the transitions of the clock signals S0 and S1 respectively, for a reason to be described later herein. Finally, clock signals FP0 and FP1 are short duration pulses which occur on the positive transitions of the clock signals S0 and S1 respectively.

Time-slot Interchanger 5100-0

A detailed diagram of time-slot interchanger 5100-0 is shown in FIGS. 11 through 16, arranged in accordance with FIG. 24. The digital words transmitted by port controllers 4000-0 through 4000-31 are received by TSI input circuit 5200. The digital words transmitted to port controllers 4000-0 through 4000-3 are transmitted by TSI output circuit 5600. Words are transferred from TSI input circuit 5200 via register 5290 to TSI output circuit 5600 in accordance with source and destination addresses and read and write signals transmitted by TSI control circuit 5400.

Figure 11:
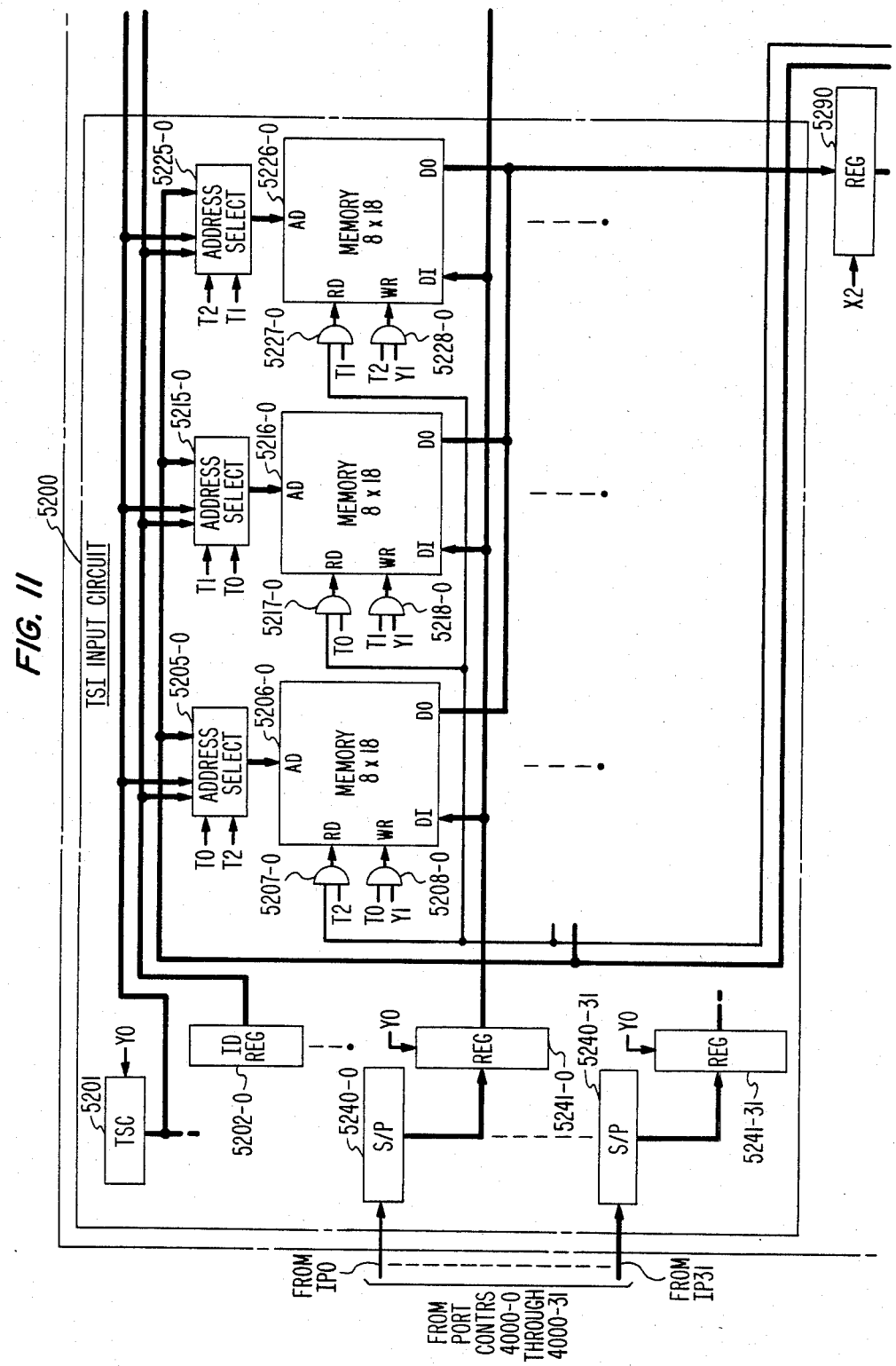
Figure 12:
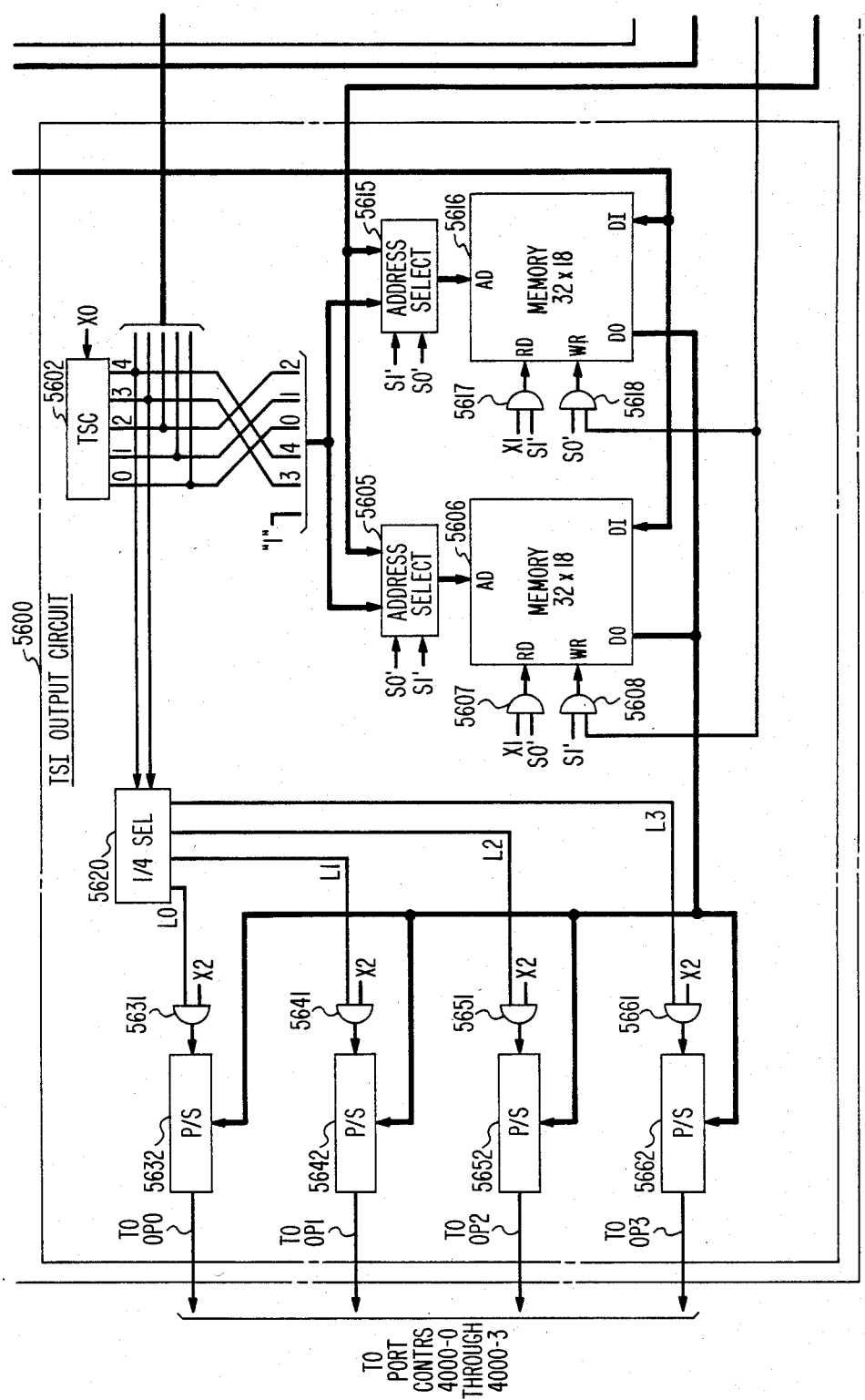
Figure 13:
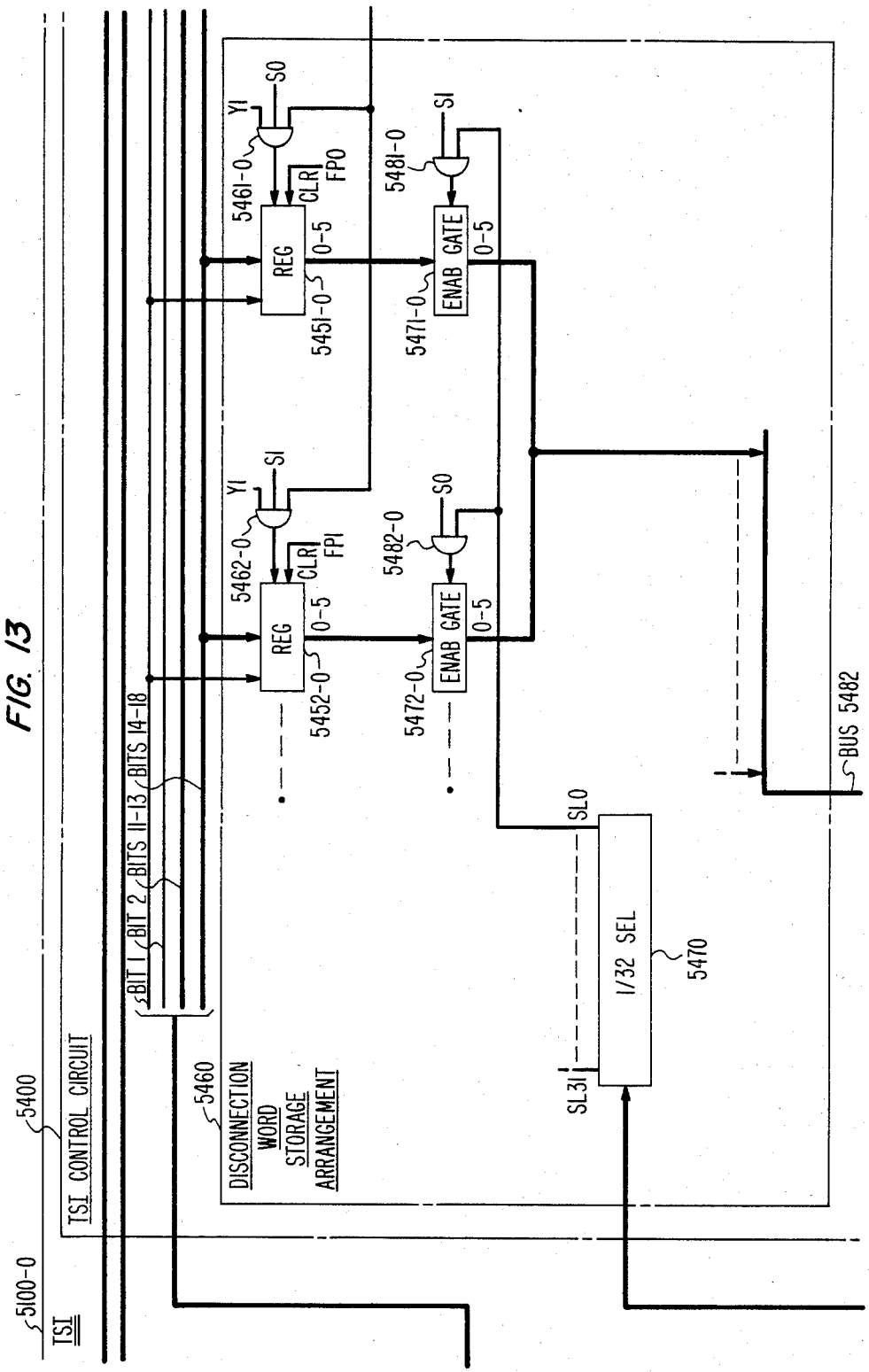

TSI input circuit 5200 includes 96, 8×18 random access memories 5206-0 through 5206-31, 5216-0 through 5216-31 and 5226-0 through 5226-31, with only the three memories 5206-0, 5216-0 and 5226-0 associated with input port IP0 being shown in FIG. 11. Digital words are written into memory 5206-0 during the frame defined by the clock signal T0 but are read therefrom two frames later during the frame defined by the clock signal T2. Digital words are written into memory 5216-0 during the frame defined by the clock signal T1 but are read therefrom two frames later during the frame defined by the clock signal T0. Digital words are written into memory 5226-0 during the frame defined by the clock signal T2 but are read therefrom two frames later during the frame defined by the clock signal T1. Eighteen-bit digital words are received serially from the input ports IP0 through IP31 by 32 serial-parallel registers 5240-0 through 5240-31 and are stored on the clock signal Y0 in 32, eighteen-bit registers 5241-0 through 5241-31. Only serial-parallel registers 5240-0 and 5240-31 and registers 5241-0 and 5241-31 are shown in FIG. 11. Although each of the TSI input circuit 5200 memories, e.g., 5206-0, has only eight locations, the locations have nine-bit addresses. The first bit of the address is always a logic one bit. The next five bits define the one of the 32 input ports IP0 through IP31 with which that memory is associated. An ID register 5202-0 contains the six bits 100000 which are the first six address bits for the memories 5206-0, 5216-0 and 5226-0 associated with input port IP0. Thirty-one other ID registers 5202-1 through 5202-31 (not shown) contain the first six address bits for the other TSI input circuit 5200 memories. A time-slot counter 5201, which is incremented on the clock signal Y0, repetitively generates the link time-slot designations 000 through 111 representing the channels 0 through 7 at the input ports IP0 through IP31. The link time-slot designations generated by time-slot counter 5201 are used as the final three address bits for writing the TSI input circuit 5200 memories. Although the locations of the three memories associated with a given input port, e.g., memories 5206-0, 5216-0 and 5226-0, have the same addresses, only one of the three memories is written during any given frame. For example, during the frame defined by the clock signal T0, each 18-bit digital word stored in register 5241-0 is written on the clock signal Y1 into the memory 5206-0 location defined by ID register 5202-2 and time-slot counter 5201. Similarly only one of the three memories 5206-0, 5216-0 and 5226-0 is read during each frame at a location defined by the source address transmitted from TSI control circuit 5400. The address selectors 5205-0, 5215-0 and 5225-0 and the AND gates 5207-0, 5208-0, 5217-0, 5218-0, 5227-0 and 5228-0 are used in conjunction with the clock signals T0, T1, and T2 as shown in FIG. 11 to achieve the above-described pipelined operation of memories 5206-0, 5216-0 and 5226-0.

The TSI input circuit 5200 memories comprise a triple-buffered memory arrangement. Two-hundred-fifty-six digital words are stored in TSI input circuit 5200 during one frame, during the next frame any of those digital words that are circuit setup request words or circuit disconnect request words are used to appropriately change the contents of control memory 5445 as will be described and then during a third frame up to 32 of those digital words are read from TSI input circuit 5200 and are transmitted via a register 5290 to be written in TSI output circuit 5600.

Figure 15:
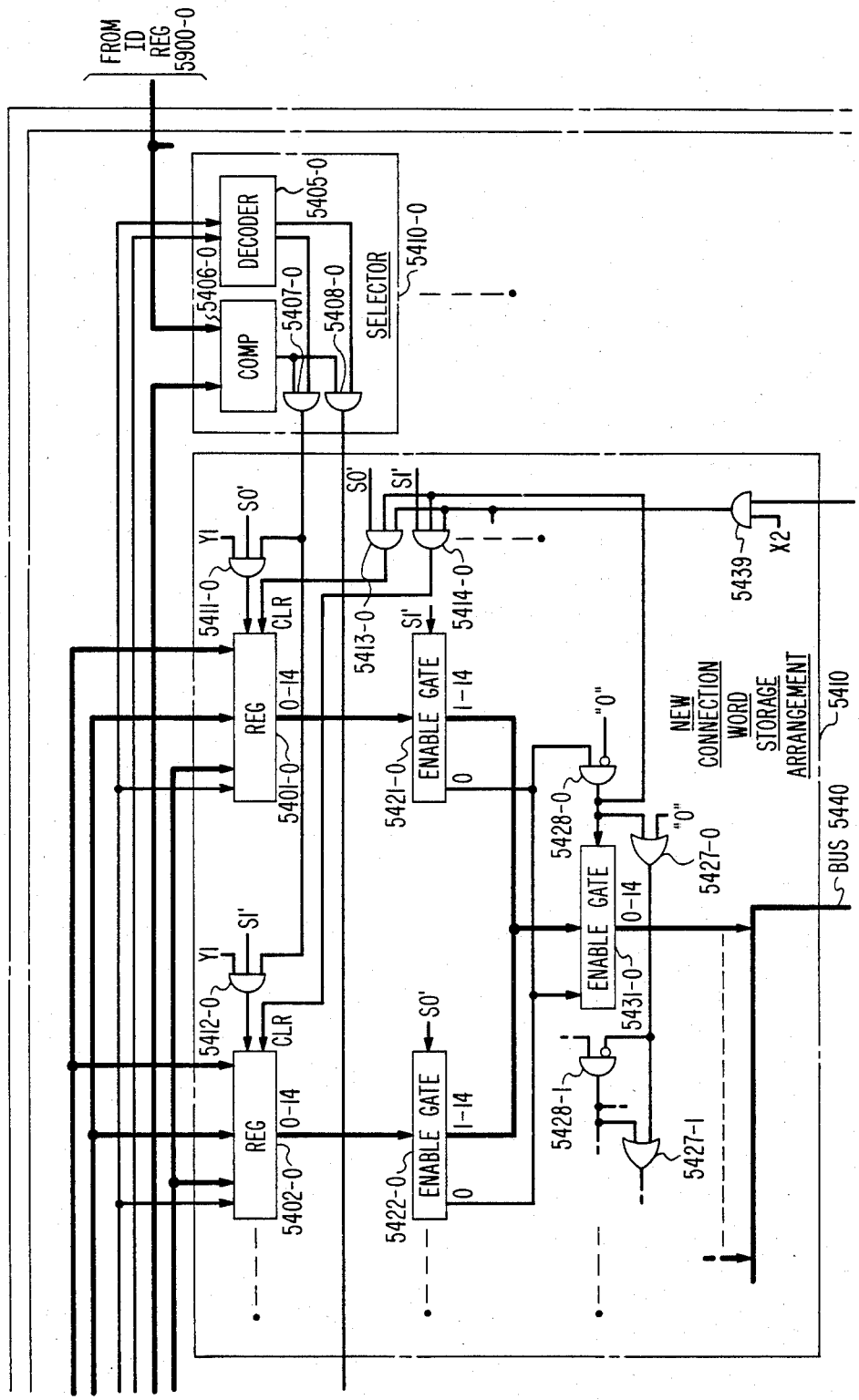
Figure 16:
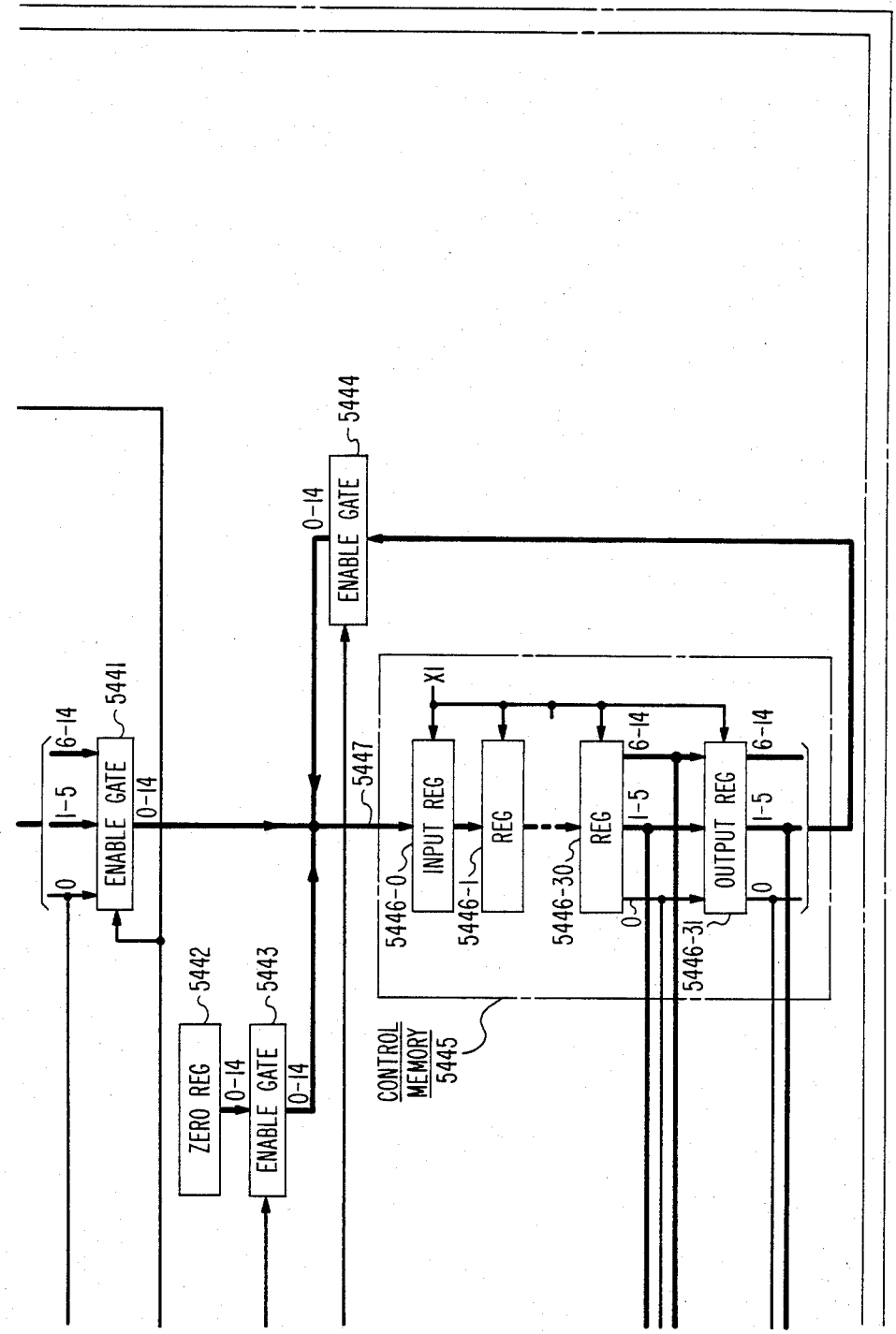

The contents of the registers 5241-0 through 5241-31 are also made available to new connection word storage arrangement 5410 and disconnection word storage arrangement 5460. Only the portion of new connection word storage arrangement 5410 used for storing new connection words in response to circuit setup request words stored in register 5241-0 from input port IP0 is explicitly shown in FIG. 15. Recall that port controller 4000-0 transmits at most one circuit setup request word in each frame to network 5000 input port IP0. If one of the eight digital words stored in register 5241-0 during a given frame is a circuit setup request word defining a destination channel of one the links 3002-0 through 3002-3, 15 bits of that circuit setup request word are stored as a new connection word in one the two 15-bit registers 5401-0 and 5402-0. A selector 5410-0 associated with input port IP0 monitors the digital words stored in register 5241-0. (Thirty-one selectors 5410-1 through 5410-31 substantially identical to selector 5410-0 are associated with input ports IP1 through IP31 but are not shown in FIG. 15.) Selector 5410-0 includes a comparator 5406-0 and a decoder 5405-0. Decoder 5405-0 receives bits 1 and 2 of each digital word stored in register 5241-0 which define the digital word as an idle word, a data word, a circuit setup request word or a circuit disconnect request word. When decoder 5405-0 determines that the digital word is a circuit setup request word, decoder 5404-0 transmits a logic one signal to an AND gate 5407-0. Comparator 5406-0 receives the bits stored in ID register 5900-0 (FIG. 10) and compares them with bits 11 through 13 of the digital word stored in register 5241-0. Recall that ID register 5900-0, being associated with time-slot interchanger 5100-0, contains the bits 000. When bits 11-13 of a given circuit setup request word stored in register 5241-0 are the bits 000 indicating that the requested destination link is one of the four links 3002-0 through 3002-3 served by time-slot interchanger 5100-0, comparator 5406-0 transmits a logic one signal to the other input terminal of AND gate 5407-0. In response, AND gate 5407-0 transmits a logic one signal to two AND gates 5411-0 and 5412-0 associated with registers 5401-0 and 5402-0 respectively. AND gate 5411-0 receives at its other two input terminals the clock signals S0' and Y1. AND gate 5412-0 receives at its other two input terminals the clock signals S1' and Y1. Accordingly, depending on whether the given circuit setup request word is present in register 5241-0 during a frame defined by S0' or during a frame defined by S1', 15 bits of that circuit setup request word are stored as a new connection word in either register 5401-0 or register 5402-0 on the clock signal Y1. Up to 32 circuit setup request words present in registers 5241-0 through 5241-31 during a frame defined by the clock signal S0' can effect the storage of new connection words in the 32 registers 5401-0 through 5401-31. Similarly up to 32 circuit setup request words present in registers 5241-0 through 5241-31 during a frame defined by the clock signal S1' can effect the storage of new connection words in the 32 registers 5402-0 through 5402-31. Only registers 5401-0 and 5402-0 are shown in FIG. 15. Recall that only circuit setup request words defining one of the links 3002-0 through 3002-3 effect the storage of new connection words in the new connection word storage arrangement 5410 of time-slot interchanger 5100-0. The 15-bit new connection words stored in registers 5401-0 and 5402-0 comprise a six-bit destination address and a nine-bit source address. The destination address (bits 0 through 5) comprise bits 1 and 14 through 18 of the circuit setup request word stored in register 5241-0. Bit 1 of each circuit setup request word is always a logic one bit and bits 14–18 define the one of the 32 possible destination channels, i.e., destination channels 0 through 7 of links 3002-0 through 3002-3 (FIG. 17). The nine-bit source address (bits 6 through 14) comprise the contents of ID register 5202-0 and the link time-slot designation being generated by time-slot counter 5201. The source addresses stored in registers 5401-0 and 5402-0 will range from 100000000 to 100000111.

Circuit disconnect request words stored in register 5241-0 that define one of the links 3002-0 through 3002-3 similarly effect the storage of disconnection words in 32 six-bit registers 5451-0 through 5451-31 and in 32 six-bit registers 5452-0 through 5452-31. Only the registers 5451-0 and 5452-0 are shown in disconnection word storage arrangement 5460 in FIG. 13. When decoder 5405-0 of selector 5410-0 determines that a given digital word stored in register 5241-0 is a circuit disconnect request word, decoder 5405-0 transmits a logic one signal to an AND gate 5408-0. If the circuit disconnect request word defines one of the links 3002-0 through 3002-3 served by time-slot interchanger 5100-0, comparator 5406-0 transmits a logic one signal to the other input terminal of AND gate 5408-0. In response, AND gate 5408-0 transmits a logic one signal to two AND gates 5461-0 and 5462-0 associated with registers 5451-0 and 5452-0 respectively. AND gate 5461-0 receives at its other two input terminals the clock signals S0 and Y1. AND gate 5462-0 receives at its other two input terminals the clock signals S1 and Y1. Accordingly, depending on whether the given circuit disconnect request word is present in register 5241-0 during a frame defined by S0 or during a frame defined by S1, six bits of that circuit disconnect request word are stored as a disconnection word in one of the two registers 5451-0 or 5452-0 on the clock signal Y1. Up to 32 circuit disconnect request words present in the registers 5241-0 through 5241-31 during a frame defined by the clock signal S0 can effect the storage of disconnection words in registers 5451-0 through 5451-31. Similarly up to 32 circuit disconnect request words present in the registers 5241-0 through 5241-31 during a frame defined by the clock signal S1 can effect the storage of disconnection words in registers 5452-0 through 5452-31. Recall however that only circuit disconnect request words defining one of the links 3002-0 through 3002-3 served by time-slot interchanger 5100-0 effect the storage of disconnection words in disconnection word storage arrangement 5460 of time-slot interchanger 5100-0. The six-bit disconnection words stored in registers 5451-0 and 5452-0 comprise bits 1 and 14 through 18 of the circuit disconnect request words present in register 5241-0. Bit 1 of a circuit disconnect request word is always a logic one bit and bits 14 through 18 define the one of the 32 possible destination channels to be disconnected, i.e., destination channels 0 through 7 of links 3002-0 through 3002-3 (FIG. 17).

The storage of new connection words and disconnection words in the registers of new connection word storage arrangement 5410 and disconnection word storage arrangement 5460 is not dependent on whether the storage of words is controlled by the clock signals S0' and S1' as in arrangement 5410 or by the clock signals S0 and S1 as in arrangement 5460 since the clock signal Y1 occurs after both the S0 and S0' transitions and after both the S1 and S1' transitions. The need for the skewed clock signals S0' and S1' is described later herein.

The contents stored in registers 5451-0 through 5451-31 during a given frame sequentially transmitted during the next frame via 32 enable gates 5471-0 through 5471-31 and a bus 5482 to define the addresses of a 32×1 random access memory 5494 in disconnect memory arrangement 5490 to be written with logic one bits. (Concurrently, during that next frame, disconnection word are being stored in the registers 5452-0 through 5452-31.) Similarly, the contents stored in registers 5452-0 through 5452-31 during that next frame are sequentially transmitted during the following frame via 32 enable gates 5472-0 through 5472-31 and bus 5482 to define the addresses of a second 32×1 random access memory 5493 in disconnect memory arrangement 5490 to be written with logic one bits.

A time-slot counter 5602 included in TSI output circuit 5600 is incremented on the clock signal X0 and repetitively generates the five-bit TSI time-slot designations 00000 through 11111 representing TSI time slots 0 through 31. The TSI time-slot designations generated by time-slot counter 5602 are transmitted to a 1-out-of-32 selector 5470 which generates a logic one signal on the one of 32 conductors SL0 through SL31 thus defined. The logic one signal generated on conductor SL0 during TSI time slot 0 is transmitted to two AND gates 5481-0 and 5482-0 associated with enable gates 5471-0 and 5472-0 respectively. The logic one signals generated on conductors SL1 through SL31 are similarly transmitted to AND gates 5481-1 through 5481-31 and to AND gates 5482-1 through 5482-31. AND gate 5481-0 receives at its other input terminal the clock signal S1. Accordingly, the contents stored in register 5451-0 during a frame defined by the clock signal S0 are transmitted via enable gate 5471-0 on bus 5482 during TSI time slot 0 of the following frame defined by the clock signal S1. Similarly the contents stored in register 5452-0 during a frame defined by the clock signal S1 are transmitted via enable gate 5472-0 on bus 5482 during TSI time slot 0 of the following frame defined by the clock signal S0.

The registers 5451-0 through 5451-31 are cleared by the short-duration pulse signal FP0 occurring on the positive transition of the clock signal S0 (FIG. 20). The registers 5452-0 through 5452-31 are cleared by the short-duration pulse signal FP1 occurring on the positive transition of the clock signal S1.

Figure 14:
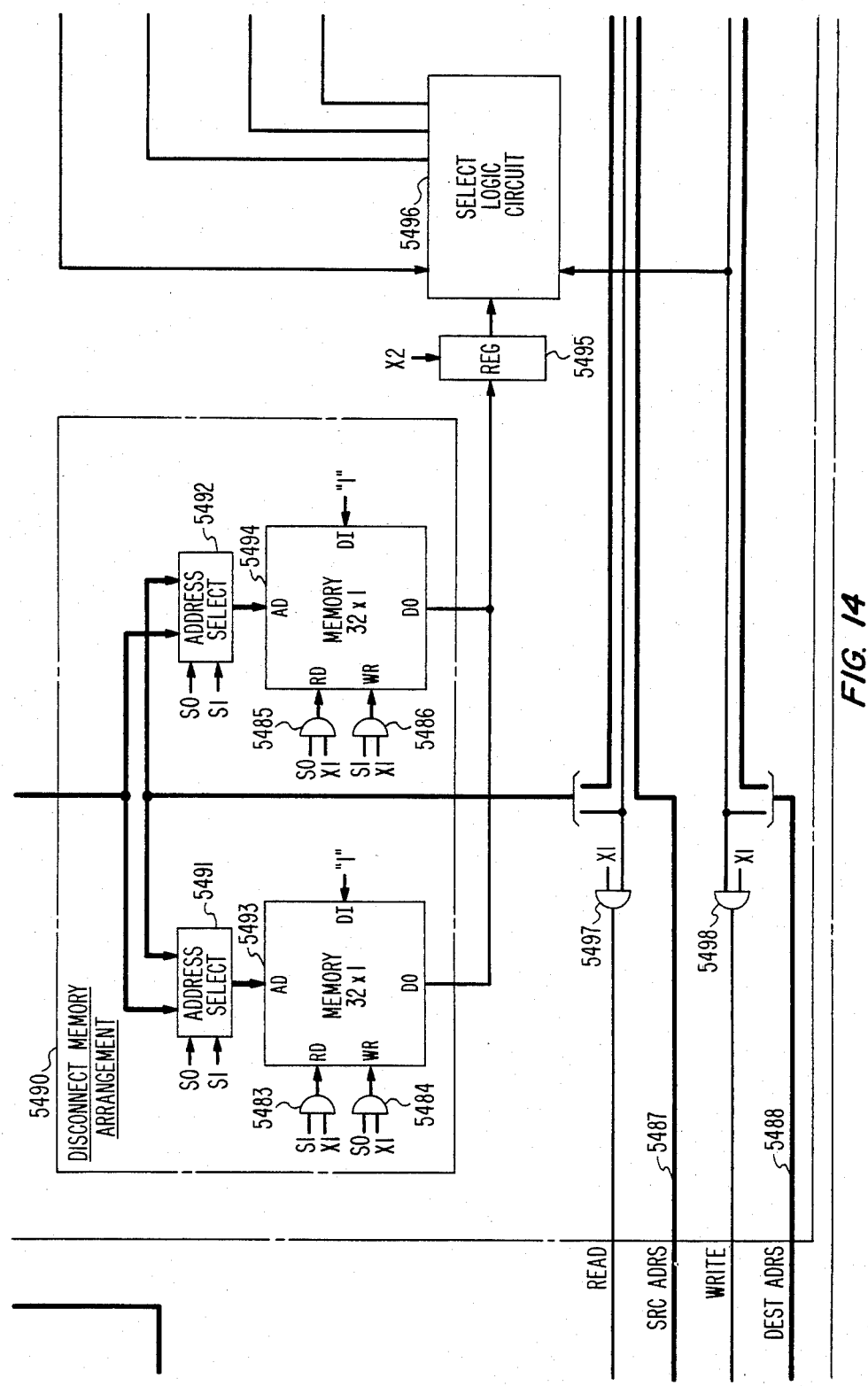

The disconnection words transmitted on bus 5482 are conveyed via two address selectors 5491 and 5492 to the memories 5493 and 5494 of disconnect memory arrangement 5490. Although the memories 5493 and 5494 each have only 32 locations, those locations are defined by the six-bit addresses from 100000 to 111111. Each of the 32 locations in each of the memories 5493 and 5494 is associated with one of the 32 possible destination channels to be disconnected. The clock signals S0, S1 and X1 are transmitted to four AND gates 5483, 5484, 5485 and 5486 as indicated in FIG. 14 to control the reading and writing of memories 5493 and 5494. During a frame defined by the clock signal S0, each disconnection word (identified as such by having a logic one in bit 0) transmitted on bus 5482 effects the storage on the clock signal X1 of a logic one bit in the memory 5493 location defined by that disconnection word. A logic one bit stored in a given memory 5493 location indicates that the circuit to the destination channel associated with that location is to be disconnected during the next frame. Similarly, during a frame defined by the clock signal S1, each disconnection word transmitted on bus 5482 effects the storage on the clock signal X1 of a logic one bit in the memory 5494 location defined by that disconnection word. The memories 5493 and 5494 are destructive read memories such that once a logic one bit stored therein has been read and stored in register 5495 to effect a disconnection via control memory 5445, that logic one bit is replaced by a logic zero bit.

Note that by the operation of the port controllers 4000-0 through 4000-31 in conjunction with the 32 cycling status words, it is possible, though unlikely, that 32 circuit disconnect request words defining the 32 possible destination channels served by time-slot interchanger 5100-0 are transmitted to time-slot interchanger 5100-0 during one frame and that 32 circuit setup request words defining the 32 possible destination channels served by time-slot interchanger 5100-0 are transmitted to time-slot interchanger 5100-0 during the following frame. Accordingly, it is possible that during any given frame, e.g., a frame defined by the clock signal S0, logic one bits are written into all 32 locations of memory 5493 and new connection words are stored in all 32 of the registers 5401-0 through 5401-31 of new connection word storage arrangement 5410.

The transmission of new connection words from the registers 5401-0 through 5401-31 and 5402-0 through 5402-31 via bus 5440 and enale gate 5441 for storage in input register 5446-0 of control memory 5445 is accomplished by means of a daisy-chain arrangement of gates only symbolically indicated in FIG. 15. Assume that the frame defined by the clock signal S0' has just occurred so that new connection words have been stored in certain ones of the registers 5401-0 through 5401-31. During the next frame as defined by the clock signal S1', the contents of registers 5401-0 through 5401-31 are made available via 32 enable gates 5421-0 through 5421-31 to the input terminals of 32 enable gates 5431-0 through 5431-31. Bit 0 of the digital word in register 5401-0 defined that word as a new connection word when it is a logic one bit. Bit 0 of the word in register 5401-0 is transmitted via enable gate 5421-0 to an AND gate 5428-0. AND gate 5428-0 has a logic zero permanently connected to its inverting input terminal. Accordingly, if the word present in register 5401-0 is a new connection word, AND gate 5428-0 transmits a logic one signal to enable gate 5431-0 and that new connection word is made available on bus 5440. The logic one signal is transmitted via an OR gate 5427-0 to the inverting input terminal of AND gate 5428-1. In response AND gate 5428-1 transmits a logic zero signal to disable enable gate 5431-1 (not shown) to prevent the contents of register 5401-1 from being transmitted on bus 5440. The logic one signal transmitted by OR gate 5427-0 is also transmitted via subsequent OR gates 5427-1 through 5427-30 to subsequent AND gates 5428-2 through 5428-31 to prevent the contents of registers 5402-2 through 5402-31 from being transmitted on bus 5440. The new connection word from register 5401-0 remains on bus 5440 until select logic circuit 5496 transmits a logic one signal to enable gate 5441 and that new connection word is conveyed thereby to input register 5446-0 of control memory 5445 for storage therein. The logic one signal transmitted by select logic circuit 5496 to enable gate 5441 is also conveyed to an AND gate 5439. The other input terminal of AND gate 5439 reeives the clock signal X2. Accordingly, AND gate 5439 transmits a short duration pulse (as defined by the width of the clock signal X2) to input terminals of 32 AND gates 5413-0 through 5413-31 associated with the registers 5401-0 through 5401-31 and to input terminals of 32 AND gates 5414-0 through 5414-31 associated with registers 5402-0 through 5402-31. AND gate 5413-0 receives at its other input terminals the clock signal S0' and the logic signal generated by AND gate 5428-0. Accordingly, AND gate 5413-0 transmits a logic one signal to clear register 5401-0. Accordingly, bit 0 of register 5401-0 which is conveyed via enable gate 5421-0 to AND gate 5428-0 becomes a logic zero and enable gate 5431-0 is disabled. However, assuming that register 5401-1 also contains a new connection word, the logic one in bit 0 of register 5401-1 is conveyed via enable gate 5421-1 to AND gate 5428-1. OR gate 5427-0 now transmits a logic zero signal to the inverting input terminal of AND gate 5428-1. In response, AND gate 5428-1 transmits a logic one signal to enable gate 5431-1 and the new connection word present in register 5401-1 is now available on bus 5440. The logic one signal transmitted by AND gate 5428-1 is conveyed to OR gate 5427-1 and the subsequent OR gates 5427-2 through 5427-30 and to subsequent AND gates 5428-2 through 5428-31 to prevent the contents of registers 5401-2 through 5401-31 from being transmitted on bus 5440. The duration of the pulse generated by AND gate 5439 is sufficiently short that only the one of the registers 5401-0 through 5401-31 from which a new connection word was just stored in input register 5446-0 of control memory 5445 is cleared by that pulse. The operation within new connection word storage arrangement 5410 of transmitting new connections words from the registers 5402-0 through 5402-31 to bus 5440 during the frames defined by the clock signal S0′ is substantially identical to that just described for frames defined by the clock signal S1′.

The operation of control memory 5445 and the means by which the new connection words stored in new connection word storage arrangement 5410 and the logic one bits stored in disconnect memory arrangement 5490 effect changes to the contents of control memory 5445 have been described in the General Description section above. The transmission of a source address of a given connection word from register 5446-30 via path 5487 to TSI input circuit 5200 precedes by one TSI time slot the transmission of the destination address of the given connection word from output register 5446-31 via path 5488 to TSI output circuit 5600. Therefore, the per frame clock signals S0′ and S1′ within TSI output circuit 5600 and new connection word storage arrangement 5410 are delayed by one TSI time slot with respect to the per frame clock signals T0, T1 and T2 within TSI input circuit 5200 and the clock signals S0 and S1 within disconnection word storage arrangement 5460 and disconnect memory arrangement 5490 such that the correct frame boundaries are maintained therein. If control memory 5445 contains 32 connection words, i.e., words representing active connections in contrast to null words representing no connection, 32 of the digital words stored in the TSI input circuit 5200 memories will be read and stored in register 5290 during a given frame.

TSI output circuit 5600 includes a double-buffered memory arrangement comprising two, 32×18 random access memories 5606 and 5616. Two address selectors 5605 and 5615 are associated with memories 5606 and 5616 respectively. The locations of memories 5606 and 5616 are defined the six-bit addresses from 100000 through 111111. During a given frame defined by the clock signal S0′, words stored in register 5290 on the clock signal X2 of each TSI time slot are stored in memory 5616 on the clock signal X1 of the following time slot at the locations defined by the destination addresses transmitted from output register 5446-31 of control memory 5445. During the following frame as defined by the clock signal S1′, as words from register 5290 are being written into memory 5606, the 32 locations of memory 5616 are being read in a predetermined sequence defined by time-slot counter 5602. The two least significant bits (bits 3 and 4) generated by time-slot counter 5602 are transmitted to a 1-out-of-4 selector 5620 which in response thereto transmits a logic one signal on the one of four conductors L0 through L3 thus defined to one of four AND gates 5631, 5641, 5651 and 5661. The other input terminal of each of the AND gates 5631, 5641, 5651 and 5661 is connected to the clock signal X2. Memory 5616 has the associated AND gates 5617 and 5618 and memory 5606 has the associated AND gates 5607 and 5608 to control the reading and writing of those memories. During the frame defined by the clock signal S1′, the locations of memory 5616 are read on the clock signal X1 and stored in one of four parallel-serial registers 5632, 5642, 5652 and 5662 on the clock signal X2 in the following sequence. The word read from memory 5616 location 100000 is stored in register 5632, the word read from memory 5616 location 100001 is stored in register 5642, the word read from memory 5616 location 100010 is stored in register 5652, the word read from memory 5616 location 100011 is stored in register 5662 and the word read from memory 5616 location 100100 is stored in register 5632 etc. This order is achieved be transposing the order of the bits of the TSI time-slot designations transmitted by time-slot counter 5602 that are presented to address selector 5615. The digital words stored in the parallel-serial registers 5632, 5642, 5652 and 5662 are then transmitted serially to the network 5000 output ports OP0 through OP3 at the rate of eight digital words per frame.

It is to be understood that the above-described embodiment is merely illustrative of the principles of the invention and that other arrangements may be devised by those skilled in the art without departing from the spirit and scope of the invention. For example, although the exemplary fast circuit switching system is described herein in the context of data communication applications, the system is also applicable to digitally encoded voice. In addition, although the sequential access, circulating control memory 5445 is implemented in this example as a plurality of series-connected registers with an output register connected back to an input register, such control memory can also be implemented using a first-in-first-out memory with its output connected back to its input or using two first-in-first-out memories having the output of each memory connected to the input of the other memory.

What is claimed is:

1. An arrangement comprising
a plurality of input storage locations for storing digital words,
a plurality of output storage locations for storing digital words.
control memory input path means for sequentially receiving connection words each defining one of said input storage locations and one of said output storage locations,
control memory means for storing, for at most a predetermined duration, each of said connection words received by said control memory input path means,
transfer means coupled to said control memory means and responsive to said connection words stored by said control memory means, for transferring digital words stored in ones of said input storage locations, to ones of said output storage locations as defined by those connection words and
first enable gate means also coupled to said control memory means, for selectively transmitting ones of said connection words stored by said control memory means, to said control memory input path means for storage again by said control memory means.

2. An arrangement in accordance with claim 1 further comprising
new connection word storage means for storing new connection words each defining one of said input storage locations and one of said output storage locations and
second enable gate means coupled to said new connection word storage means, for transmitting said new connection words stored by said new connection word storage means, to said control memory input path means for storage by said control memory means.

3. An arrangement in accordance with claim 2 further comprising
means for controlling said second enable gate means such that said new connection words stored by said new connection word storage means, are transmitted to said control memory input path means during times when no connection words stored by said control memory means, are being transmitted by said first enable gate means.

4. An arrangement in accordance with claim 3 further comprising
- a plurality of disconnect memory locations each associated with one of said output storage locations, for storing disconnect signals and
- inhibit means coupled to said disconnect memory locations, for inhibiting the transmission by said first enable gate means of a given one of said connection words stored by said control memory means, when one of said disconnect signals is stored in the one of said disconnect memory locations associated with the one of said output storage locations defined by that given connection word.

5. An arrangement in accordance with claim 4 wherein said control memory means comprises
- input register means,
- output register means and
- a plurality of intermediate register means connected in series between said input register means and said output register means,
- wherein said input register means is connected to receive connection words from said control memory input path means and to transmit connection words to a first one of said intermediate register means,
- wherein said output register means is connected to receive connection words from a last one of said intermediate register means and to transmit connection words to said first enable gate means and
- wherein said arrangement further comprises means for shifting each connection word received by said control memory input path means through said input register means, said plurality of intermediate register means and said output register means.

6. An arrangement in accordance with claim 5 wherein said transfer means comprises
- means coupled to said last intermediate register means for reading digital words from ones of said input storage locations defined by the connection words shifted to said last intermediate register means and
- means coupled to said output register means for writing digital words read from said input storage locations, into ones of said output storage locations defined by the connection words shifted to said output register means.

7. An arrangement in accordance with claim 5 further comprising
- disconnect memory reading means connected to said last intermediate register means for reading the ones of said disconnect memory locations defined by the connection words shifted to said last intermediate register means and
- disconnect register means for temporarily storing disconnect signals read from ones of said disconnect memory locations by said disconnect memory reading means and
- wherein said inhibit means inhibits the transmission by said first enable gate means of the connection words shifted to said output register means, whenever one of said disconnect signals read by said disconnect memory reading means is present in said disconnect register means.

8. An arrangement in accordance with claim 4 further comprising
- disconnection word storage means for storing disconnection words each defining one of said output storage locations,
- bus means for transmitting said disconnection words stored in said disconnection word storage means and
- means responsive to each of said disconnection words transmitted by said bus means, for storing a disconnect signal in one of said disconnect memory locations that is associated with the one of said output storage locations defined by that disconnection word.

9. An arrangement in accordance with claim 4 further comprising
- third enable gate means for transmitting null words to said control memory input path means for storage by said control memory means and
- means for controlling said third enable gate means such that ones of said null words are transmitted to said control memory input path means during times when no connection words stored by said control memory means are being transmitted by said first enable gate means and no new connection words stored by said new connection word storage means are being transmitted by said second enable gate means.

10. An arrangement in accordance with claim 1 further comprising
- a plurality of disconnect memory locations each associated with one of said output storage locations, for storing disconnect signals and
- inhibit means coupled to said disconnect memory locations, for inhibiting the transmission by said first enable gate means of a given one of said connection words stored by said control memory means, when one of said disconnect signals is stored in the one of said disconnect memory locations associated with the one of said output storage locations defined by that given connection word.

11. An arrangement in accordance with claim 10 further comprising
- disconnection word storage means for storing disconnection words each defining one of said output storage locations,
- bus means for transmitting said disconnection words stored in said disconnection word storage locations and
- means responsive to each of said disconnection words transmitted by said bus means, for storing a disconnect signal in one of said disconnect memory locations that is associated with the one of said output storage locations defined by that disconnection word.

12. An arrangement in accordance with claim 1 wherein said control memory means comprises
- input register means,
- output register means and
- a plurality of intermediate register means connected in series between said input register means and said output register means,
- wherein said input register means is connected to receive connection words from said control memory input path means and to transmit connection words to a first one of said intermediate register means, wherein said output register means is connected to receive connection words from a last one of said intermediate register means and to transmit connection words to said first enable gate means and wherein said arrangement further comprises means for shifting each connection word received by said control memory input path means through said input register means, said plurality of intermediate register means and said output register means.

13. An arrangement in accordance with claim 12 wherein said transfer means comprises means coupled to said last intermediate register means for reading digital words from ones of said input storage locations defined by the connection words shifted to said last intermediate register means and means coupled to said output register means for writing digital words read from said input storage locations, into ones of said output storage locations defined by the connection words shifted to said output register means.

14. A time-slot interchanger comprising at least one incoming time-multiplexed line for receiving digital words in frames of a substantially fixed duration, at least one outgoing time-multiplexed line for transmitting digital words, a plurality of input storage locations for storing the digital words received on said at least one incoming time-multiplexed line during at least three consecutive ones of said frames, a plurality of output storage locations for storing digital words to be transmitted on said at least one outgoing time-multiplexed line, control memory input path means for sequentially receiving, during the second of said three consecutive frames, connection words defining ones of said input storage locations and ones of said output storage locations, control memory means for storing, for at most said substantially fixed duration, each of said connection words received by said control memory input path means, transfer means coupled to said control memory means and responsive to said connection words stored by said control memory means, for transferring, during the third or said three consecutive frames, digital words received on said at least one incoming time-multiplexed line and stored in ones of said input storage locations during the first of said three consecutive frames, to ones of said output storage locations as defined by those connection words, means for transmitting digital words stored in said output storage locations, on said at least one outgoing time-multiplexed line and first enable gate means also coupled to said control memory means, for selectively transmitting ones of said connection words, received by said control memory input path means during the second of said three consecutive frames and stored by said control memory means, to said control memory input path means during the third of said three consecutive frames for storage again by said control memory means.

15. A time-slot interchanger in accordance with claim 14 further comprising new connection word storage means responsive to the digital words, received on said at least one incoming time-multiplexed line during the first of said three consecutive frames, that are circuit setup request words defining ones of said output storage locations, for storing new connection words each defining one of said input storage locations and one of said output storage locations and second enable gate means coupled to said new connection word storage means, for transmitting, during the second of said three consecutive frames, said new connection words stored by said new connection word means, to said control memory input path means for storage by said control memory means.

16. A time-slot interchanger in accordance with claim 15 further comprising means for controlling said second enable gate means such that said new connection words stored by said new connection word storage means, are transmitted to said control memory input path means during times when no connection words stored by said control memory means, are being transmitted by said first enable gate means.

17. A time-slot interchanger in accordance with claim 16 further comprising a plurality of disconnect memory locations each associated with one of said output storage locations, for storing disconnect signals and inhibit means coupled to said disconnect memory locations, for inhibiting the transmission, during the third of said three consecutive frames, by said first enable gate means of a given one of said connection words stored by said control memory means, when one of said disconnect signals is stored in the one of said disconnect memory locations associated with the one of said output storage locations defined by that given connection word.

18. A time-slot interchanger in accordance with claim 17 further comprising disconnection word storage means responsive to the digital words, received on said at least one incoming time-multiplexed line during the first of said three consecutive frames, that are circuit disconnect request words defining ones of said output storage locations, for storing disconnection words each defining one of said output storage locations, bus means for transmitting, during the second of said three consecutive frames, said disconnection words stored in said disconnection word storage means and means responsive to each of said disconnection words transmitted by said bus means, for storing a disconnect signal in one of said disconnect memory locations that is associated with the one of said output storage locations defined by that disconnection word.

19. A time-slot interchanger comprising a plurality of incoming time-multiplexed lines for receiving digital words in incoming frames of a substantially fixed duration, a plurality of outgoing time-multiplexed lines for transmitting digital words in outgoing frames of said substantially fixed duration, a plurality of input storage locations for storing the digital words received on said incoming time-multiplexed lines during at least three consecutive ones of said incoming frames, a plurality of output storage locations for storing digital words to be transmitted on said outgoing time-multiplexed lines during at least two consecutive ones of said outgoing frames, control memory input path means for sequentially receiving, during the second of said three consecutive incoming frames, connection words defining ones of said input storage locations and ones of said output storage locations, control memory means for storing, for at most said substantially fixed duration, each of said connection words received by said control memory input path means, transfer means coupled to said control memory means and responsive to said connection words stored by said control memory means, for transferring, during the third of said three consecutive incoming frames, digital words received on said incoming time-multiplexed lines and stored in ones of said input storage locations during the first of said three consecutive incoming frames, to ones of said output storage locations as defined by those connection words, to be transmitted on said outgoing time-multiplexed lines during the second of said two consecutive outgoing frames and first enable gate means also coupled to said control memory means, for selectively transmitting ones of said connection words, received by said control memory input path means during the second of said three consecutive incoming frames and stored by said control memory means, to said control memory input path means during the third of said three consecutive incoming frames for storage again by said control memory means.

20. A time-slot interchanger in accordance with claim 19 further comprising new connection word storage means responsive to the digital words, received on said incoming time-multiplexed lines during the first of said three consecutive incoming frames, that are circuit setup request words defining ones of said output storage locations, for storing new connection words each defining one of said input storage locations and one of said output storage locations and second enable gate means coupled to said new connection word storage means, for transmitting, during the second of said three consecutive incoming frames, said new connection words stored by said new connection word means, to said control memory input path means for storage by said control memory means.

21. A time-slot interchanger in accordance with claim 20 further comprising means for controlling said second enable gate means such that said new connection words stored by said new connection word storage means, are transmitted to said control memory input path means during times when no connection words stored by said control memory means, are being transmitted by said first enable gate means.

22. A time-slot interchanger in accordance with claim 21 further comprising a plurality of disconnect memory locations each associated with one of said output storage locations, for storing disconnect signals and inhibit means coupled to said disconnect memory locations, for inhibiting the transmission, during the third of said three consecutive incoming frames, by said first enable gate means of a given one of said connection words stored by said control memory means, when one of said disconnect signals is stored in the one of said disconnect memory locations associated with the one of said output storage locations defined by that given connection word.

23. A time-slot interchanger in accordance with claim 22 further comprising disconnection word storage means responsive to the digital words, received on said incoming time-multiplexed lines during the first of said three consecutive incoming frames, that are circuit disconnect request words defining ones of said output storage locations, for storing disconnection words each defining one of said output storage locations, bus means for transmitting, during the second of said three consecutive incoming frames, said disconnection words stored in said disconnection word storage means and means responsive to each of said disconnection words transmitted by said bus means, for storing a disconnect signal in one of said disconnect memory locations that is associated with the one of said output storage locations defined by that disconnection word.

* * * * *